United States Patent
Kaneda et al.

(10) Patent No.: US 7,188,213 B2
(45) Date of Patent: Mar. 6, 2007

(54) MANAGEMENT COMPUTER AND METHOD OF MANAGING DATA STORAGE APPARATUS

(75) Inventors: Yasunori Kaneda, Sagamihara (JP);
Daisuke Shinohara, Yokohama (JP);
Takahiro Fujita, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 239 days.

(21) Appl. No.: 10/811,868

(22) Filed: Mar. 30, 2004

(65) Prior Publication Data

US 2005/0165787 A1   Jul. 28, 2005

(30) Foreign Application Priority Data

Jan. 23, 2004   (JP)   ............... 2004-015313

(51) Int. Cl.
*G06F 12/00* (2006.01)
(52) U.S. Cl. .................................. 711/117
(58) Field of Classification Search .............. 711/117
See application file for complete search history.

(56) References Cited

U.S. PATENT DOCUMENTS

| 2003/0172239 A1* | 9/2003 | Swank ................. 711/163 |
|---|---|---|
| 2003/0182177 A1 | 9/2003 | Gallagher et al. |
| 2003/0188085 A1 | 10/2003 | Arakawa et al. |
| 2003/0229645 A1 | 12/2003 | Mogi et al. |
| 2004/0068561 A1 | 4/2004 | Yamamoto et al. |
| 2004/0193760 A1 | 9/2004 | Matsunami et al. |
| 2004/0257857 A1 | 12/2004 | Yamamoto et al. |
| 2005/0015685 A1 | 1/2005 | Yamamoto |
| 2006/0129877 A1 | 6/2006 | Yamamoto et al. |

FOREIGN PATENT DOCUMENTS

| JP | 2002-288055 | 10/2002 |
|---|---|---|
| WO | 97/09676 | 3/1997 |

OTHER PUBLICATIONS

IBM User Interface Architecture, Dec. 2001, available at http://www-306.ibm.com/ibm/easy/eou_ext.nsf/publish/1392/$File/IBM_UIA.pdf.*

* cited by examiner

*Primary Examiner*—Brian R. Peugh
*Assistant Examiner*—Jared Rutz
(74) *Attorney, Agent, or Firm*—Mattingly, Stanger, Malur & Brundidge, P.C.

(57) ABSTRACT

In a computer system having hierarchically-arranged data storage apparatuses, a management computer provides information required for performing operation on the data storage apparatuses.

Through a network for collecting management information, storage area information and hierarchy information are collected from each data storage apparatus. Management relation information is created using the collected storage area information and the collected hierarchy information together with programs for respectively managing the data storage apparatuses, and, the created management relation information is held. Based on the created management relation information, a display screen expressing the hierarchy of the data storage apparatuses is created. Further, responding to operation by a user, a return considering the hierarchy is displayed.

19 Claims, 20 Drawing Sheets

FIG.7A

| TOTAL STORAGE AREA NUMBER (248a) | MANAGEMENT I/F IDENTIFICATION NUMBER (248b) | IDENTIFIER (248c) | CAPACITY (248d) |
|---|---|---|---|
| 3 | 220 | ABC. XX200. 0123. 211 | 100GB |
| | | ABC. XX200. 0123. 212 | 100GB |
| | | ABC. XX200. 0123. 213 | 100GB |

FIG.7B

| TOTAL STORAGE AREA NUMBER (148a) | MANAGEMENT I/F IDENTIFICATION NUMBER (148b) | IDENTIFIER (148c) | CAPACITY (148d) |
|---|---|---|---|
| 1 | 120 | DEF. YY100. 0456. 111 | 100GB |

FIG.7C

| TOTAL STORAGE AREA NUMBER (198a) | MANAGEMENT I/F IDENTIFICATION NUMBER (198b) | IDENTIFIER (198c) | CAPACITY (198d) |
|---|---|---|---|
| 2 | 170 | GHI. ZZ100. 0789. 161 | 100GB |
| | | GHI. ZZ100. 0789. 162 | 100GB |

| 245a | 245b | 245c | 245d | 245e | 245f |
|---|---|---|---|---|---|
| TOTAL STORAGE AREA NUMBER | IDENTIFIER | CAPACITY | LOWER STORAGE AREA EXISTENCE FLAG | IDENTIFIER | CAPACITY |
| 3 | ABC.XX200.0123.211 | 100GB | 0 | | |
| | ABC.XX200.0123.212 | 100GB | 1 | DEF.YY100.0456.111 | 100GB |
| | ABC.XX200.0123.213 | 100GB | 2 | GHI.ZZ100.0789.161 | 100GB |

| 5701 DATA STORAGE AREA NUMBER | 5701a 5701b UPPER DATA STORAGE APPARATUS | | 5701c 5701d | | 5702 5702a 5702b LOWER DATA STORAGE APPARATUS | | 5702c 5702d | 5702e |
|---|---|---|---|---|---|---|---|---|
| | MANAGEMENT I/F IDENTIFICATION NUMBER | MANAGEMENT PROGRAM IDENTIFICATION NUMBER | ICON NUMBER | IDENTIFIER | ICON | MANAGEMENT I/F IDENTIFICATION NUMBER | MANAGEMENT PROGRAM IDENTIFICATION NUMBER | ICON NUMBER | IDENTIFIER |
| 201 | 220 | 521 | 621 | ABC.XX200.0123 | 101 | 120 | 522 | 622 | GHI.ZZ100.0789 |
| | | | | | 102 | 170 | 523 | 623 | DEF.YY100.0456 |

FIG.19A

| FIRST NETWORK INTERFACE NUMBER 243a | SECOND NETWORK INTERFACE NUMBER 243b | MANAGEMENT PROGRAM NUMBER 243c |
|---|---|---|
| 0 | 0 | 0 |

| FIRST NETWORK INTERFACE NUMBER 143a | SECOND NETWORK INTERFACE NUMBER 143b | MANAGEMENT PROGRAM NUMBER 143c |
|---|---|---|
| 5101 | 5901 | 522 |

| FIRST NETWORK INTERFACE NUMBER 193a | SECOND NETWORK INTERFACE NUMBER 193b | MANAGEMENT PROGRAM NUMBER 193c |
|---|---|---|
| 5102 | 5902 | 523 |

| FIRST NETWORK INTERFACE NUMBER 243a | SECOND NETWORK INTERFACE NUMBER 243b | MANAGEMENT PROGRAM NUMBER 243c |
|---|---|---|
| 510 | 590 | 521 |

UPPER DATA STORAGE APPARATUS

| DATA STORAGE AREA NUMBER | MANAGEMENT I/F IDENTIFICATION NUMBER | MANAGEMENT PROGRAM IDENTIFICATION NUMBER | ICON NUMBER | IDENTIFIER | MANAGEMENT DEVICE NUMBER |
|---|---|---|---|---|---|
| 201 | 220 | 521 | 621 | ABC.XX200.0123 | 220 |

LOWER DATA STORAGE APPARATUS

| DATA STORAGE AREA NUMBER | MANAGEMENT I/F IDENTIFICATION NUMBER | MANAGEMENT PROGRAM IDENTIFICATION NUMBER | ICON NUMBER | IDENTIFIER | MANAGEMENT DEVICE NUMBER |
|---|---|---|---|---|---|
| 101 | 5901 | 522 | 622 | GHI.ZZ100.0789 | 5901 |
| 102 | 5902 | 523 | 623 | DEF.YY100.0456 | 5902 |

MANAGEMENT COMPUTER AND METHOD OF MANAGING DATA STORAGE APPARATUS

BACKGROUND OF THE INVENTION

The present invention relates to a technique of managing a plurality of data storage apparatuses in a computer system including a plurality of data storage apparatuses, and in particular to a technique of managing data storage apparatuses in a computer system in which those data storage apparatuses are connected hierarchically.

A storage area network, i.e., a network for data storage apparatuses, in which a plurality of data storage apparatuses and a plurality of computers are connected through devices such as switches and hubs, is becoming popular. In a storage area network, a network of fibre channels is mainly used as a network connecting data source apparatuses and computers, and a computer and a data storage apparatus send and receive SCSI (Small Computer System Interface) command blocks on a fibre channel, to send and receive data and programs used by the computer or data generated by the computer.

On the other hand, management of a configuration of data storage apparatuses and computers and monitoring of occurrence of a failure are performed by sending and receiving SNMP (Simple Network Management Protocol) or CIM/WBEM (Common Information Model/Web-Based Enterprise Management) through IP network constructed separately from the above network of the fibre channels. This network is called a management network.

Thus, management and operation of a computer system comprising a plurality of data storage apparatuses, a plurality of computers and a plurality of switches and hubs are performed by constructing two networks, i.e., a storage area network and a management network (See, for example, Patent Document 1: Japanese Patent Laid-Open Publication No. 2002-288055).

On the other hand, there is a system in which a first data storage apparatus and a second data storage apparatus are hierarchically connected to a computer (See, fur example, Patent Document 2: Published Japanese Translation No. 10-508967 of International Application). Patent Document 2 discloses a storage system that realizes online data migration between the hierarchically-connected first data storage apparatus and the second data storage apparatus while the computer is not aware of the hierarchy of the data storage apparatuses.

In a computer system having a plurality of hierarchically-connected data storage apparatuses, it is not necessary for the computer to be aware of the hierarchy of the data storage apparatuses, when data storage apparatuses is sending/receiving the data to/from the computer, as disclosed in Patent Document 2.

However, in the case of performing operation such as deletion of a storage area provided by a data storage apparatus to the computer, an administrator should be aware of the configuration of the data storage apparatuses. This is because, for example, when the administrator deletes a storage area of a lower data storage apparatus without considering the hierarchy, a storage area used by an upper data storage apparatus is deleted also. When the administrator performs incorrect operation on a storage area without considering the hierarchy or the data storage apparatuses, it is possible to lose data held in the storage area. Thus, in a computer system including data storage apparatuses, it is unavoidable to employ a technique of preventing such incorrect operation.

SUMMARY OF THE INVENTION

As described above, the technique disclosed in Patent Document 2 aims to migrate data from the first data storage apparatus to the second data storage apparatus. On the other hand, Patent Document 2 does not describe configuration management of the data storage apparatuses having the hierarchical configuration of the two data storage apparatuses, i.e., the first data storage apparatus and the second data storage apparatus. In other words, Patent Document 2 does not refer to management of the hierarchical data storage apparatuses considering the hierarchy.

The present invention has been made considering the above point. And, an object of the present invention is to provide a management computer that gives information required for operation on a data storage apparatus in a computer system having a hierarchical configuration of data storage apparatuses.

To achieve the above object, the management computer according to the present invention provides information, based on which, it is possible to manage data storage apparatuses considering the hierarchical configuration of the data storage apparatuses.

Namely, the management computer according to the present invention is connected through a second network to data storage apparatuses that are connected to computers through a first network. The above-mentioned management computer comprises: a storage area information collecting module which collects respective pieces of storage area information from the data storage apparatuses connected through the second network, wherein each piece of storage area information relates to storage areas provided by a data storage apparatus concerned; a hierarchy information collecting module which collects respective pieces of hierarchy information from the data storage apparatuses connected through the second network, wherein each piece of hierarchy information indicates hierarchy among data storage apparatuses held by a data storage apparatus concerned; and a management relation information creation module which acts hierarchy among the data storage apparatuses to create management relation information, based on the pieces of storage area information and the pieces of hierarchy information collected in the storage area information collecting module and the hierarchy information collecting module.

According to the present invention, in a computer system having hierarchically-arranged data storage apparatuses, the management computer can provide information required for performing operation on the data storage apparatuses.

BRIEF DESCRIPTION OF THE DRAWINGS

FIG. 7A is a diagram showing an example of storage area information 248 in the first and second embodiments;

FIG. 7B is a diagram showing an example of storage area information 148 in the first and second embodiments;

FIG. 7C is a diagram showing an example of storage area information 198 in the first and second embodiments;

FIG. 8 is a diagram showing an example of hierarchy information in the first and second embodiments;

FIG. 9 is a diagram showing an example of management relation information in the first embodiment;

FIG. 19A is a diagram showing an example of management computer identification information 243 in the second embodiment;

FIG. 19B is a diagram showing an example of management computer identification information 143 in the second embodiment;

FIG. 19C is a diagram showing an example of management computer identification information 193 in the second embodiment;

FIG. 19D is a diagram showing another example of the management computer identification information 243 in the second embodiment;

FIG. 21 is a diagram showing an example of management relation information in the second embodiment.

DESCRIPTION OF THE PREFERRED EMBODIMENTS

[First Embodiment]

<Outline>

Figure 1:
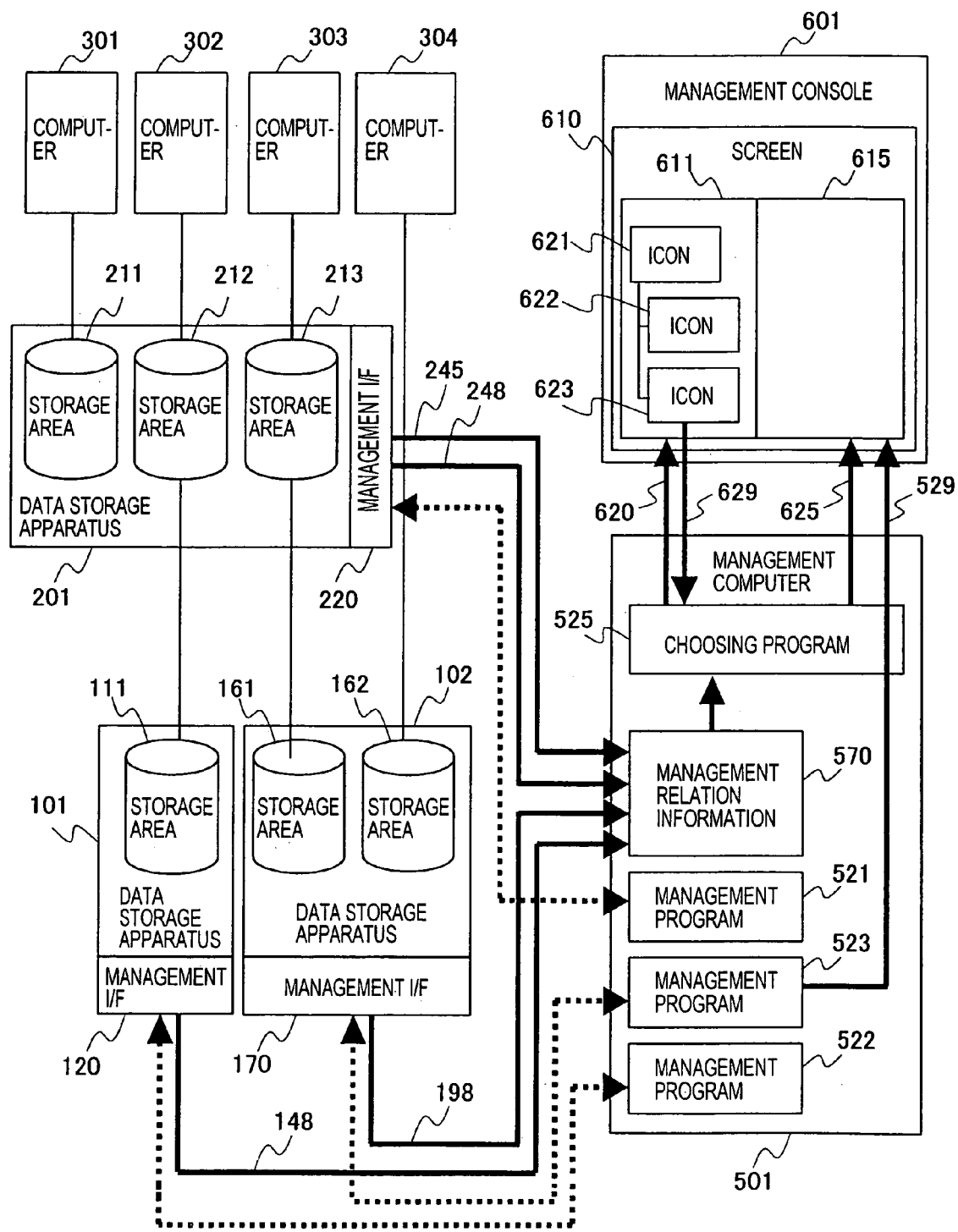
FIG. 1 is a diagram for explaining an outline of a first embodiment of the present invention.

For managing a computer system having a hierarchical configuration of data storage apparatuses, it is necessary in a management computer to provide management utility software and a hierarchical configuration in a management screen, according to the hierarchical configuration of the data storage apparatuses, in order to notify an administrator (who is going to perform operation affecting a plurality of hierarchy levels) that the operation affects a plurality of hierarchy levels, and in order to make the administrator recognize the configuration of the whole data storage apparatuses, understand the hierarchy level of the data storage apparatus as the object of the operation, and be aware of effect on the data storage apparatuses of the other hierarchy levels. Further, when there occurs a change in the status of the data storage apparatuses, it is also necessary to present the change together with hierarchy information to the administrator.

Here, "a hierarchical configuration of data storage apparatuses" means that a plurality of data storage apparatuses are connected to a computer in a multistage way, seen from the computer.

A configuration for realizing the above-described functions in a management apparatus will be described below. First, referring to FIG. 1, an outline of an embodiment of the present invention will be described.

As shown in the figure, a computer system of the present embodiment includes hierarchical groups of data storage apparatuses. As an example, the figure illustrates four computers 301 to 304, one data storage apparatus 301 constituting a first level, and two data storage apparatuses 101 and 102 constituting a second level.

Here, the data storage apparatus constituting the first level is one having only storage areas that can be directly recognized by a computer, and the data storage apparatuses constituting the second level are ones having a storage area that can be recognized by a computer through the data storage apparatus constituting the first level. Hereinafter, "upper" in hierarchy of data storage apparatuses means a level on the closer side to a computer, and "lower" means a level on the farther side from a computer.

The computer 301 can recognize a storage area 211 provided by the data storage apparatus 201, and the storage area 211 provided by the data storage apparatus 201 responds to data read and write requests from the computer 301. The storage area 211 holds programs used by the computer 301 and data used or generated by those programs.

Similarly, the computer 302 can recognize a storage area 212 provided by the data storage apparatus 201, and the storage area 212 responds to data read and write requests from the computer 302. Further, through the data storage apparatus 201, the computer 302 can recognize a storage area 111 provided by the data storage apparatus 101. And, through the data storage apparatus 201, the storage area 111 responds to data read requests and data write request sent from the computer 302. Both the storage areas 212 and 111 hold data.

The computer 303 can recognize a storage area 213 provided by the data storage apparatus 201, and the storage area 213 responds to data read and write requests from the computer 303. Further, through the data storage apparatus 201, the computer 303 can recognize a storage area 161 provided by the data storage apparatus 102. And through the data storage apparatus 201, the storage area 161 responds to data read and write requests from the computer 303. In the present embodiment, the storage area 213 can not hold data, and, as a matter of fact, the storage area 161 holds data.

The computer 304 can recognize a storage area 162 provided by the data storage apparatus 102, and the storage area 162 responds to data read and write requests from the computer 304. The storage area 162 holds programs used by the computer 304 and data used or generated by those programs.

In the computer system shown in FIG. 1, the data storage apparatuses 101, 102 and 201 have respective management interfaces 120, 170 and 220. The data storage apparatuses 101, 102 and 201 are connected to a management computer 501 through the management interfaces 120, 170 and 220, respectively.

The management computer 501 is provided with management programs 521 to 523 for managing the data storage apparatuses connected to the management computer 501. The management programs 521, 522 and 523 are programs for managing the data storage apparatuses 201, 101 and 102, respectively.

Further, the management computer 501 is provided with a choosing program 525. The choosing program 525 is a program for choosing from the management programs 521 to 523, and for generating a display screen images according to information on the hierarchy of the data storage apparatuses.

The management computer 501 is connected to a management console 601. The management console 601 is provided with a display unit 610. And, on the display unit 610, the management computer 501 can display screen images outputted by the management programs 521–523 of the management computer and screen images outputted by the choosing program 525.

The display unit 610 has two windows, i.e., a display area 615 for displaying a screen image of a management program, and a display area 611 for displaying a screen image of the choosing program 525. Thus, the display unit 610 can present information required for managing the data storage apparatuses and a configuration for understanding the hierarchy at the same time to the administrator.

Figure 2:
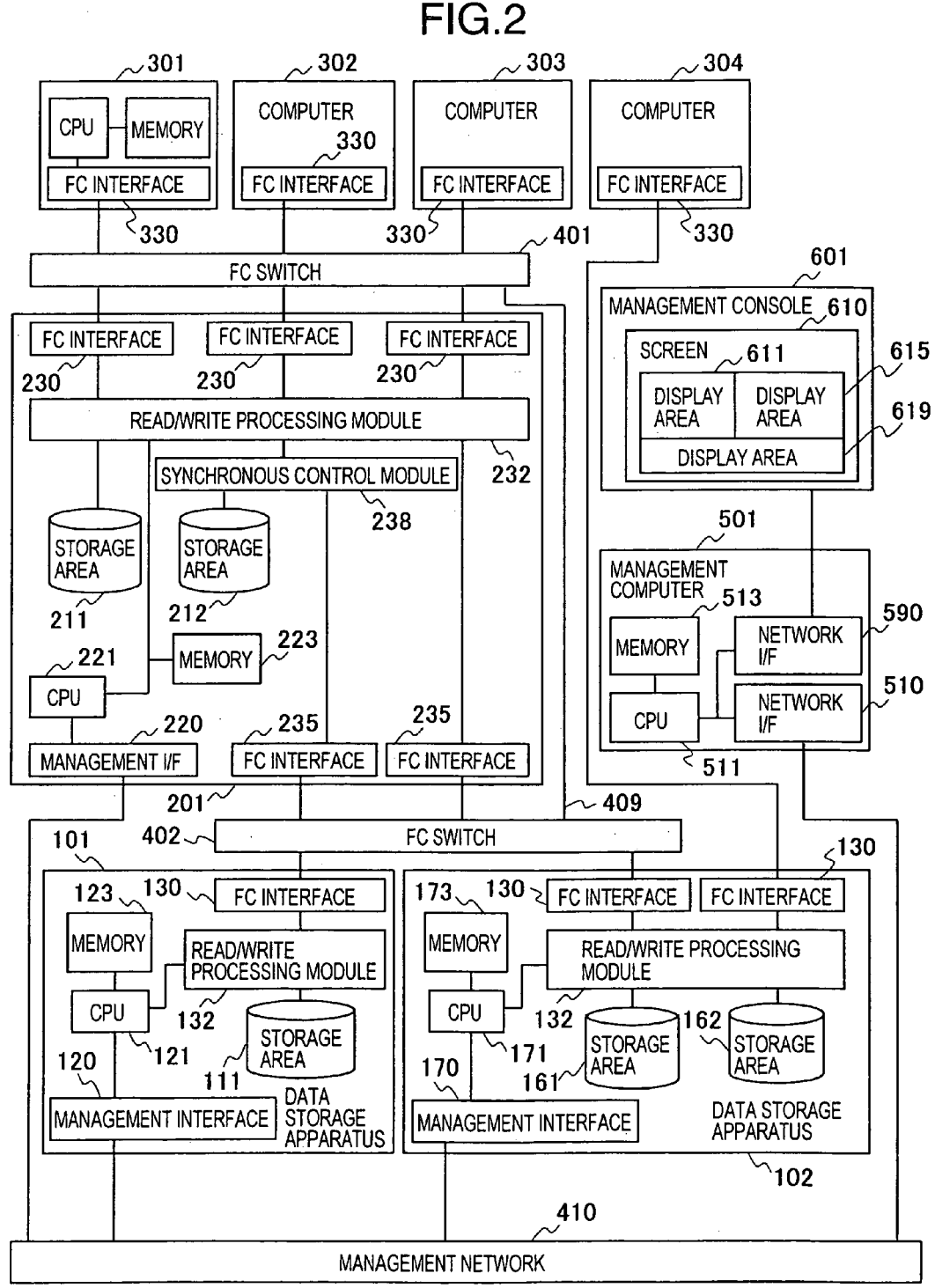
FIG. 2 is a system configuration diagram of the first embodiment.

The choosing program 525 is a program for acquiring hierarchy information 245 showing a hierarchy status of the data storage apparatuses as shown in FIG. 2, to make up a screen image 620 according to the acquired hierarchy information 245.

In the case of an example of the hierarchy information 245 shown in FIG. 8, a data storage apparatus "ABC.XX200.0123" (the data storage apparatus 201 in the figures) is connected with a data storage apparatus "DEF.YY100.0456" (the data storage apparatus 101 in the figures) and a data storage apparatus "GHI.ZZ100.0789" (the data storage apparatus 102 in the figures).

Based on the hierarchy information 245, the choosing program 525 displays icons (621 to 623) hierarchically (i.e., in a tree view) to show the hierarchy of the above-described data storage apparatuses.

Figure 11:
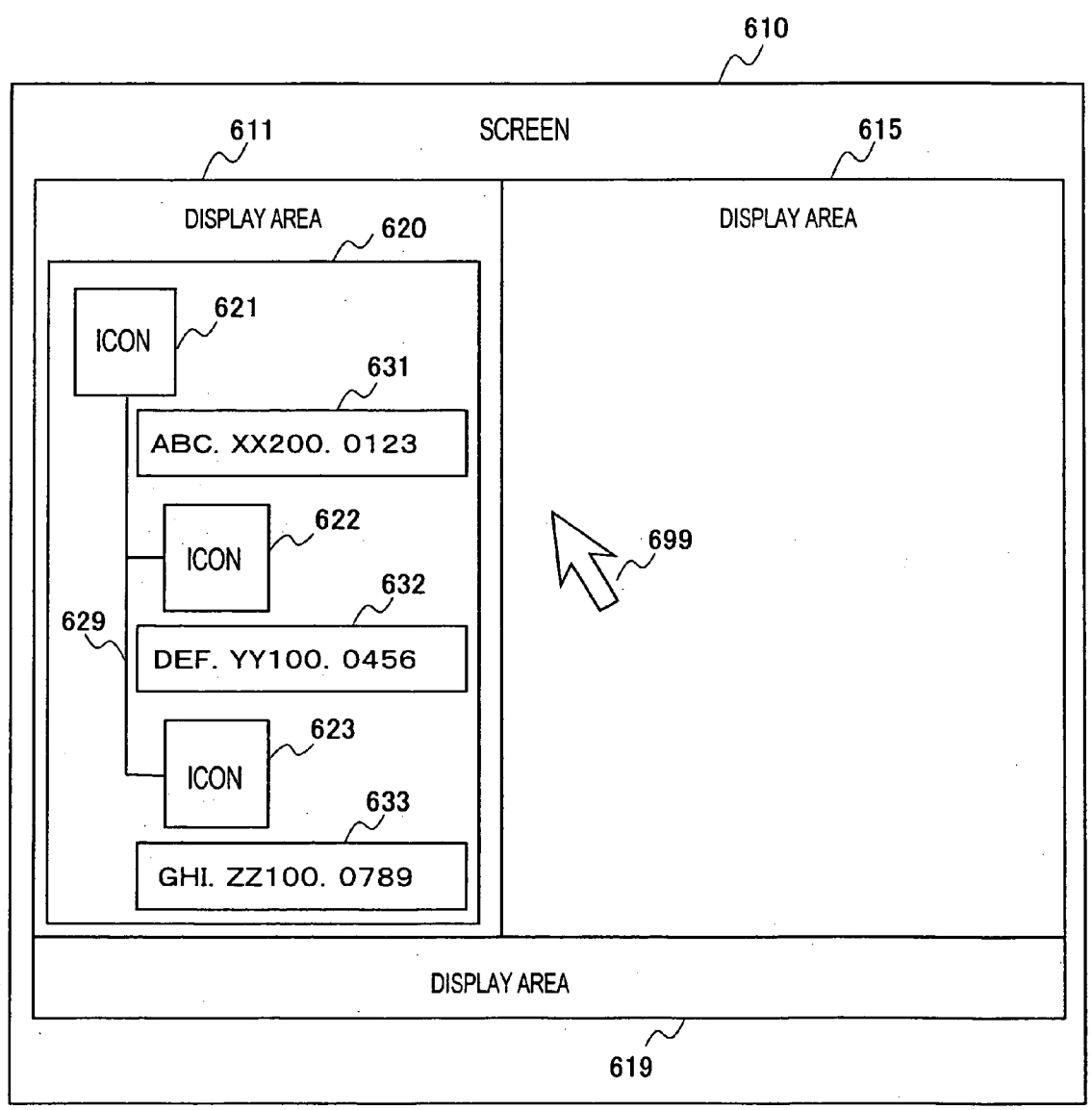
FIG. 11 shows a screen image in the first and second embodiments.

Here, a screen image is displayed to show that the two data storage apparatuses 101 and 102 are connected downward from the data storage apparatus 201. A display example is shown in FIG. 11.

When the administrator, who operates the management console 601, chooses an icon, his instruction is sent to the management computer 501, and a screen image 529 of a management program of the data storage apparatus corresponding to the chosen icon is displayed in the display area 615 of the management console 601.

When an icon indicating a data storage apparatus of the lower level is selected in the screen image 620, then, the choosing program 525 displays a screen image 625 indicating warning on the management console 601, before displaying the screen image 529 of the management program.

As a result, it is possible to show the administrator operating the management console 601 that the object of the operation instruction is a management program of a lower data storage apparatus and the operation will affect the upper data storage apparatus. In the following, will be described detailed configurations for realizing the above-described functions, centering on new configurations.

Hereinbelow, a first embodiment of the present invention will be described referring to the drawings.

<System Configuration>

FIG. 2 shows the computer system of the present embodiment.

The computer system of the present embodiment comprises the computers 301, 302, 303 and 304, the data storage apparatuses 101, 102, and 201, the management computer 501, the management console 601, and fibre channel switches (hereinafter, referred to as FC switches) 401 and 402 connecting between the computers 301 to 304 and the data storage apparatuses 101, 102 and 201.

The computers 301 to 303 are connected to the data storage apparatus 201 through the FC switch 401. Further, the computer 304 is connected to the data storage apparatus 102 through the FC switch 402.

The computers 301 to 304 each comprise a CPU 310, a memory 320 and a fibre channel interface (hereinafter, referred to as an FC interface) 330. The memory 320 holds programs to be executed by the CPU 310, data read from a data storage apparatus, and data to be written to a data storage apparatus. The computers 301 to 304 are connected to the FC switch 401 or 402 through the FC interface 330.

The data storage apparatus 201 has three FC interfaces 230 each fox connecting with the FC switch 401. The number of the provided FC interfaces 230 corresponds to the number of computers connected through the FC switch 401. The data storage apparatus 201 has a read/write processing module 232 for receiving a read/write request from a computer through an FC interface 230, returning the requested data in the corresponding storage area, and writing received data into a storage area.

The data storage apparatus 201 has storage areas 211 and 212 for holding data used by computers. In the present embodiment, it is assumed that each storage area has a capacity of 100 GB. Further, the data storage apparatus 201 has two FC interfaces 235 for connecting with other data storage apparatuses. The number of the provided FC interfaces 235 corresponds to the number of the other data storage apparatuses connected.

Further, between the storage area 212 and an FC interface 235, there is provided a synchronous control module 238 for synchronizing data between the storage area 212 and the storage area 111 connected through the FC interface 235. Control by the synchronous control module 238 is performed such that data of two storage areas (the storage areas 111 and 212, in the present embodiment) always coincide with each other.

The data storage apparatus 201 is connected with two data storage apparatuses 101 and 102 through the FC switch 402.

The data storage apparatuses 101 and 102 are each comprise an FC interface 130 to connect with the FC switch 402, and a read/write processing module 132.

The data storage apparatus 101 has the storage area 111 for holding data used by the data storage apparatus 201. Further, the data storage apparatus 102 has the storage area 161 for holding data used by the data storage apparatus 201 and the storage area 162 for holding data used by the computer 304.

Each of the data storage apparatuses 101, 102 and 201 comprises: a management interface 220, 120 or 170 for connecting with a management network 410; a CPU 221, 121 or 171 for controlling modules and the management interface within the data storage apparatus 101, 102 or 201; and a memory 223 for holding programs to be executed by the CPU 221, 121 or 171 and data sent and received to and from the management interface 220, 120 or 170. The data storage apparatuses 101, 102 and 201 are each connected to the management computer 501 through the management network 410.

The management computer comprises: a network interface 510 for connecting with the management network 410; a CPU 511 for performing processing within the management computer 501; a memory 513 for holding programs to be executed by the CPU 511, data sent and received by the network interface 510, and screen images to be displayed on the management console 601; and a network interface 590 for connecting with the management console 601.

Using the below-mentioned management programs on the management computer 501, the administrator can manage configurations and statuses of the data storage apparatuses 201, 101 and 102. Further, through the management programs, the administrator can request the data storage apparatuses 101, 102 and 201 to generate or delete a storage area.

The management console 601 has the display unit 610 for displaying screen data sent from the management computer 501. The display unit 610 has display at least a window, such as display areas 611, 615 and 619.

Figure 3:
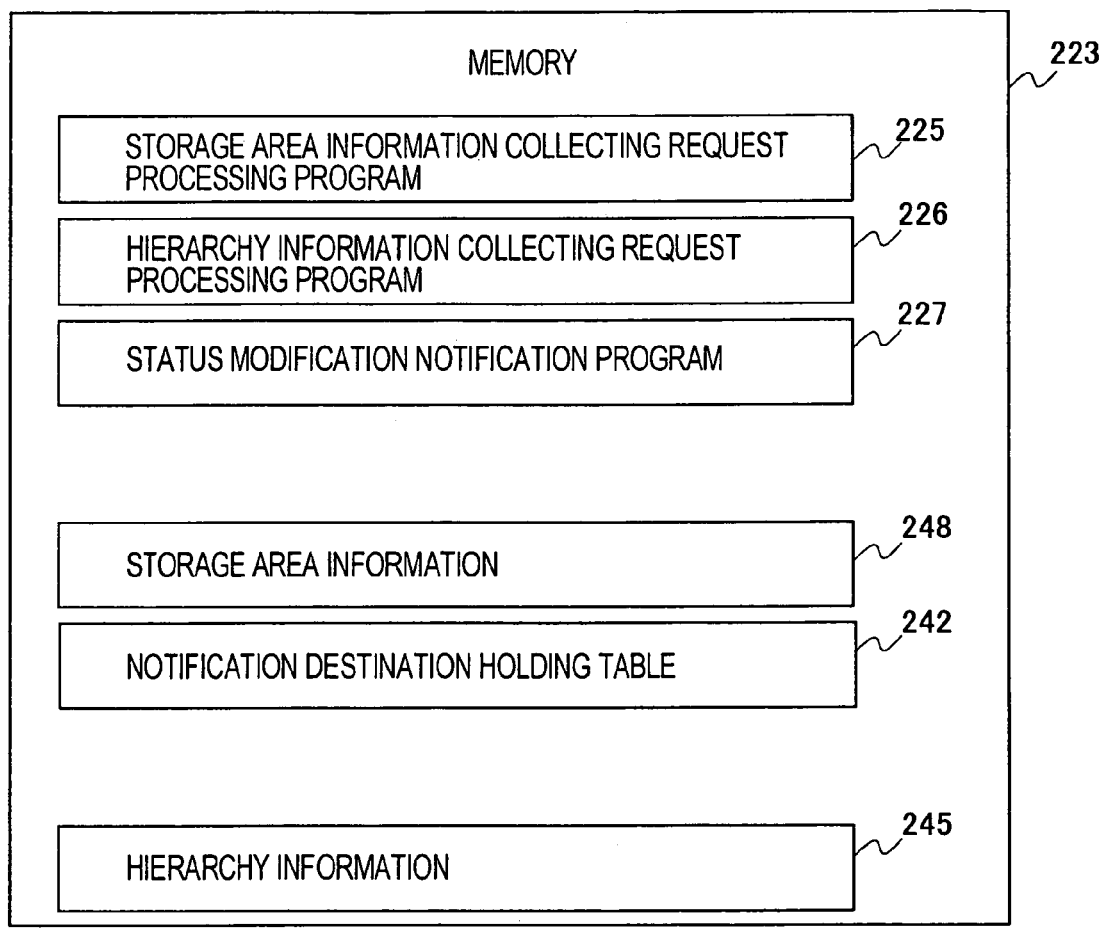
FIG. 3 is a diagram showing an example of programs and data held in a memory 223 of a data storage apparatus 201 of the first embodiment.

FIG. 3 shows programs and data held by the memory 223 of the data storage apparatus 201. The memory 223 of the data storage apparatus 201 stores: a storage area information collecting request processing program 225 for processing a storage area information collecting request; a hierarchy information collecting request processing program 226 for processing a hierarchy information collecting request; a status change notification program 227 for notifying a change in the status of the data storage apparatus concerned; storage area information 248; hierarchy information 245; and a notification destination holding table 242.

Figure 4A:
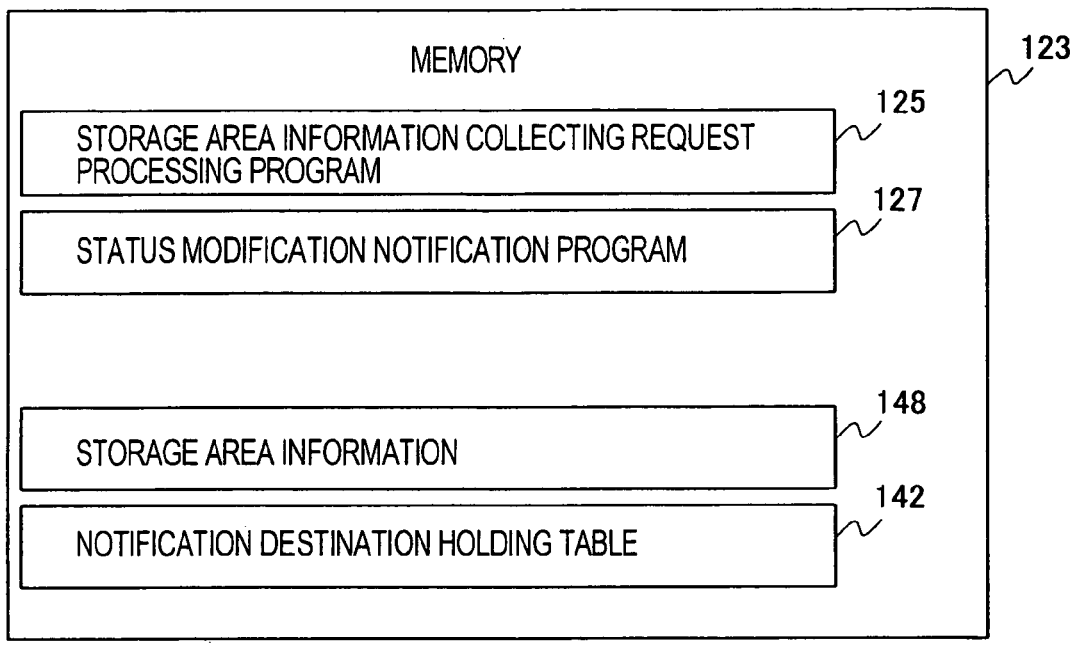
FIG. 4A is a diagram showing an example of programs and data held in a memory 123 of a data storage apparatus 101 of the first embodiment.
Figure 4B:
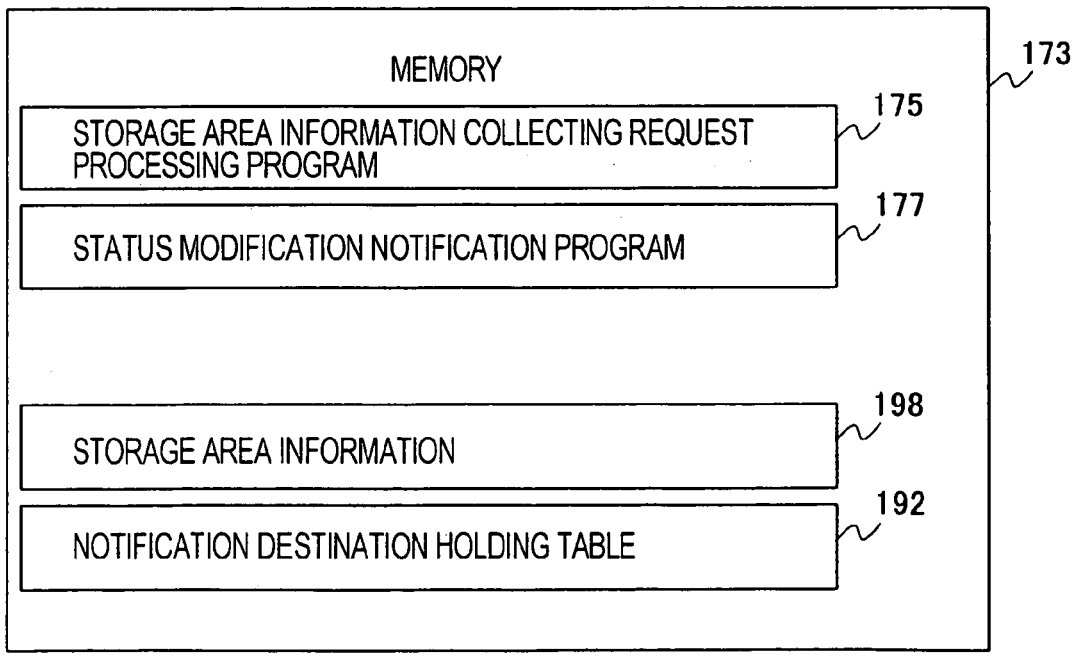
FIG. 4B is a diagram showing an example of programs and data held in a memory 173 of a data storage apparatus 102 of the first embodiment.

Further, FIG. 4A shows programs and data stored in the memory 123 of the data storage apparatus 101, and FIG. 4B shows programs and data stored in the memory 173 of the data storage apparatus 102.

The memory 123 of the data storage apparatus 101 holds: a storage area information collecting request processing program 125 for processing a storage area information collecting request; a status change notification program 127 for notifying a change in the status of the data storage apparatus concerned; storage area information 148; and notification destination holding table 142.

The memory 173 of the data storage apparatus 102 holds: a storage area information collecting request processing program 175 for processing a storage area information collecting request; a status change notification program 177 for notifying a change in the status of the data storage apparatus concerned; storage area information 198; and a notification destination holding table 192.

Figure 5:
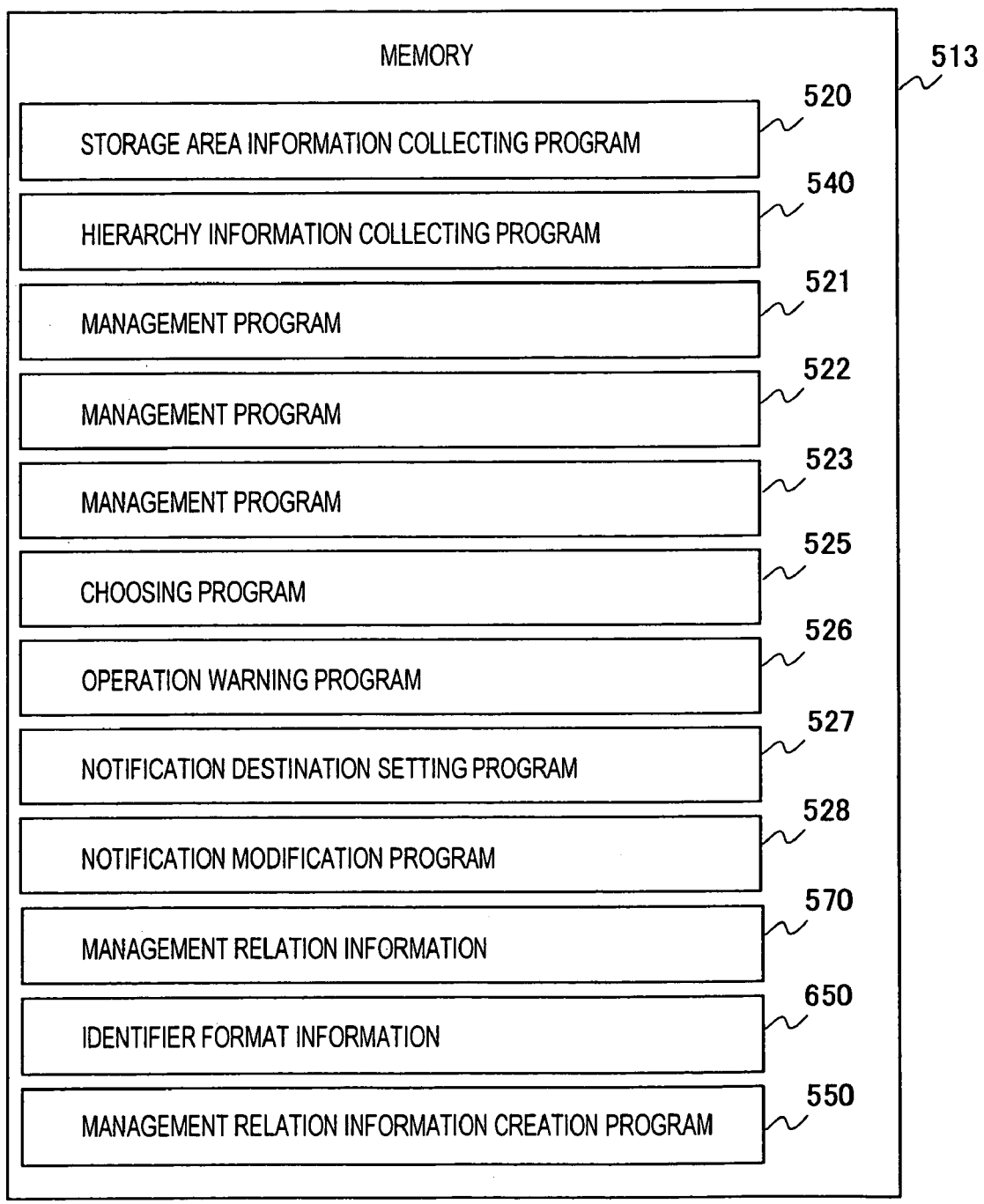
FIG. 5 is a diagram showing an example of programs and data held in a memory 513 of a management computer 501 of the first embodiment.

FIG. 5 shows data and programs held in the memory 513 of the management computer 501.

The memory 513 of the management computer 501 stores: a storage area information collecting program 520 for issuing a storage area information collecting request to a data storage apparatus; a hierarchy information collecting program 540 for issuing a hierarchy information collecting request; management programs 521 to 523 for managing the data storage apparatuses; a choosing program 525 for making choice of management programs based on the hierarchy information; an operation warning program 526 for notifying a warning when a specific operation is performed; a notification destination setting program 527 for setting a computer to which a notification from a data storage apparatus is to be sent; a notification modification program 528 for modifying information sent from a data storage apparatus, based on the hierarchy information; a management relation information creation program 550; identifier format information 650; and management relation information 570.

As described below, the management programs 521–523 are prepared in the number corresponding to the number of data storage apparatuses detected by the management computer 501. In the present embodiment, three management programs are prepared since there are three data storage apparatuses.

Various programs held in the memories 223, 123 and 173 of the data storage apparatuses 101, 102 and 201 are stored in nonvolatile storage media such as magnetic disk units provided in the data storage apparatuses, and, at the times of starting the data storage apparatuses, loaded onto the memories 223, 123 and 173, to be executed, respectively. The media for storing the programs may be other storage media (such as nonvolatile memories, CD-ROMs, or floppy disks) than the magnetic disk units. Further, the programs may be loaded from the storage media in question onto the data storage apparatuses, to be executed. Or, the storage media in question may be accessed through a network, to load the programs.

Further, various programs; stored in the memory 513 of the management computer 501 is stored in a nonvolatile storage medium such as a magnetic disk unit provided in the management computer 501, and, at the time of starting the management computer 501, loaded onto the memory 513, to be executed. Further, the medium for storing the programs may be another storage medium (such as a CD-ROM or a floppy disk) than the magnetic disk unit. Further, the programs may be loaded from the storage medium in question onto the management computer, to be executed. Or, the storage medium in question may be accessed through a network, to load the programs.

The present embodiment is described taking an example where fibre channel networks are used to connect between the computers and the data storage apparatuses, and between the data storage apparatuses themselves. However, the kind of the networks is not limited to this. Other networks can be employed similarly, selecting devices suitable for the employed networks, instead of the FC switches and the FC interfaces. Further, it is possible to employ a configuration where the FC switches 401 and 402 are cascaded through a network 409.

Next, will be described data held in the data storage apparatuses 201, 101 and 102 and the management computer 501.

<Identifier Format Information>

In the present embodiment, to specify and manage the data storage apparatuses 201, 101 and 102 and the storage areas 211, 212, 111, 161 and 162 provided by those data storage apparatuses, the data storage areas are given with respective identifiers. An identifier is given according to a specific format. The identifier format information 650 is data indicating a format of an identifier to be given, namely, indicating a meaning of each component of an identifier.

Figure 6:
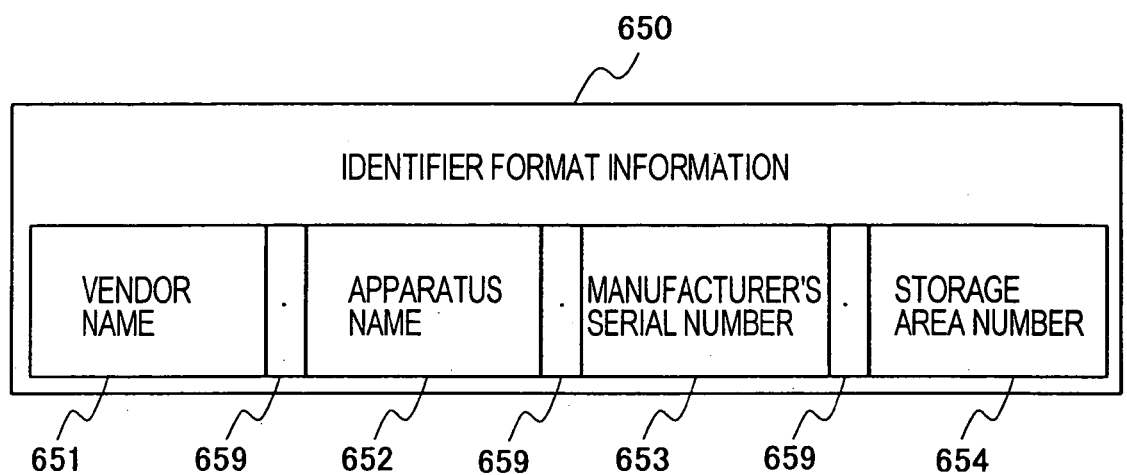
FIG. 6 is a diagram showing an example of identifier format information 650 used in first and second embodiments.

FIG. 6 shows an example of the identifier format information 650 used in the present embodiment.

As shown in the figure, it is assumed that, in the computer system of the present embodiment, a specific character string is used as identification format information 650. In detail, identification format information 650 is a character string in which a vendor name 651, an apparatus name 652, a manufacturer's serial number 653 and a storage area number 654 are arranged in this order, being separated by a delimiter (a dot "."). Each data storage apparatus 201, 101 or 102 is specified by the vendor name 651, the apparatus name 652 and the manufacturer's serial number 653.

In the present embodiment, it is assumed that the data storage apparatus 201 has a vendor name "ABC", an apparatus name "XX200" and a manufacturer's serial number "0123". The data storage apparatus 101 has a vendor name "DEF", an apparatus name "YY100" and a manufacturer's serial number "0456". Further, the data storage apparatus 102 has a vendor name "GHI", an apparatus name "ZZ100" and a manufacturer's serial number "0789".

Further, in the present embodiment, as the storage area number 654, the number given to each storage area in FIG. 2 is used, for example. In that case, a character string becomes, for example, "ABC.XX200.0123.211".

In the present embodiment, the management computer 501 holds the identifier format information 650, and analyzes an identifier obtained from each data storage apparatus 201, 101 or 102, according to the below-mentioned storage area information collecting program 520, to specify the data storage apparatus and the storage area.

In the present embodiment, previously-given information for identifying each storage area may be used, as it is, as the identifier format. However, in the case where identifier formats are not consistent, or, in other words, configurations of identifiers are different from one another, then, it becomes impossible to match storage area information acquired from each data storage apparatus with the hierarchy information. Thus, in the case where formats of previously-given information do not satisfy the above condition, it is necessary in the management computer 501 to prepare a format conversion program that converts storage area identification information acquired from each data storage apparatus 101, 102 or 201 into a format that can be matched with the hierarchy information of the present embodiment.

<Storage Area Information>

Now, will he described storage area information 248, 148 or 198 held by a data storage apparatus 101, 102 or 201, as information on storage area(s) 211 and 212, 111, or 161 and 162 provided by that data storage apparatus 101, 102 or 201 to a computer or the like. In the present embodiment, the data storage apparatus 201 has the storage area information 248, the data storage apparatus 101 has the storage area information 148, and the data storage apparatus 102 has the storage area information 198.

FIGS. 7A, 7B and 7C are diagrams for explaining respective examples of the storage area information 248, the storage area information 148 and the storage area information 198, in the present embodiment.

As shown in the figure, the storage area information 248 comprises: a storage area number 248a, i.e., the number of storage areas provided to the data storage apparatus 201; an identification number 248b of the management interface of the data storage apparatus 201; identifiers 248c for respectively specifying the storage areas; and respective capacities 248d of the storage areas. Similarly, each of the storage area information 148 and 198 comprises the following items, namely: a storage area number 148a or 198a; an identification number 148b or 198b; identifier(s) 148c or 198c; and capacity(.ties) 148d or 198d.

Here, each of the identifiers 248c, 148c and 198c for specifying data storage areas is given, being composed according to the format explained in the above description of the identifier format information 650.

Each of the data storage apparatuses 101, 102 and 201 returns the storage area information 248, 148 or 198 held in itself, in response to a hierarchy information collecting request sent from the management computer 501.

<Hierarchy Information>

In the present embodiment, a data storage apparatus that is provided with a storage area having another storage area in the lower level has hierarchy information. The hierarchy information stores information such as: existence of a lower storage area, information for specifying the lower storage area when there exists such a storage area, information indicating a data storing method, and the like. In the present embodiment, only the data storage apparatus 201 is a data storage apparatus that is provided with a storage area having another storage area in the lower level. Thus, as an example, will be described the hierarchy information 245 held by the data storage apparatus 201 in its memory 223.

FIG. 8 shows an example of the hierarchy information 245 in the present embodiment. As shown in the figure, the hierarchy information 245 comprises: a total storage area number 245a; identifiers 245b for specifying storage areas; respective capacities 245c of the storage areas; lower storage area existence flags 245d showing whether a lower storage area exists; identifiers 245e for specifying the lower storage areas; and capacities 245d of the lower storage areas.

Here, each of the identifiers 246b is composed according to the format explained in the above description of the identifier format information 650.

In the present embodiment, each of the lower storage area existence flags 245d can have one of three values "0", "1" and "2". The value by "0" means that no lower storage area exists. The value "1" means that a lower storage area exists, the upper and lower storage areas each hold data, and the upper and lower storage areas are subject to synchronous control of the synchronous control module 238. And, the value "2" means that a lower storage area exists and actual data is stored in the lower storage area.

Namely, the hierarchy information 245 shown in FIG. 8 can be interrupted as follows.

With respect to the storage arena "ABC.XX200.0123.211", the lower storage area existence flag 245d is "0", and thus, the storage area "ABC.XX200.0123.211" does not have a lower storage area.

With respect to the storage area "ABC.XX200.0123.212", the lower storage area existence flag 245d is "1", and thus, the storage area "ABC.XX200.0123.212" has a lower storage area, and the identifier 245e shows that the lower storage area in question is "DEF.YY100.0456.111". Further, the storage area 212 and the storage area 111 are subject to synchronous control of the synchronous control module 238.

Further, with respect to the storage area "ABC.XX200.0123.213", the lower storage area existence flag 245d is "2", and thus, the storage area "ABC.XX200.0123.213" has the lower storage area "GHI.ZZ100.0789.161", and data is stored in the storage area 161 while the storage area 213 does not hold data actually. The data storage apparatus 201 can not hold data, and the storage area 161 undertakes to hold data. For example, when the data storage apparatus 201 receives data and an instruction from the computer 303 to write the data into the storage area 213, then, the data storage apparatus 201 requests the data storage apparatus 102 to write the received data into the storage area 161 of the data storage apparatus 102. And, the data storage apparatus 102 holds the data in the storage area 161. On the other hand, when the data storage apparatus 201 receives a request from the computer 303 to read data from the storage area 213, then, the data storage apparatus 201 reads the data from the storage area 161 that holds the data, and sends the acquired data to the computer 303.

Namely, FIG. 1 shows the storage area 213 as a virtual area, while the storage area 213 is not actually formed on the data storage apparatus 201. Thus, FIG. 2 does not show the storage area 213. The storage area 161 formed in the data storage apparatus 102 is seen from the computer 303 as if the storage area 161 is virtually formed in the data storage apparatus 201.

According to a hierarchy information collecting information from the management computer 501, the data storage apparatus 201 returns the hierarchy information 245. In the present embodiment, only the data storage apparatus 201 has the hierarchy information collecting request processing program 226, and can return the hierarchy information in response to a request from the management computer 501. Receiving the return of the hierarchy information 245, the management computer 501 can recognize that the data storage apparatuses 101 and 102 are connected under the data storage apparatus 201.

<Management Relation Information>

The management relation information 570 is information generated in the management computer 501, from the storage area information 248, 148 and 198 and the hierarchy information 245, by means of the management relation information creation program 550. The management relation information 570 stores information on the hierarchical configuration of the data storage apparatuses 201, 101 and 102, information required for the management computer 501 to access the data storage apparatuses, and the like. Here, the information on the hierarchical configuration is generated based on the hierarchy information on the storage areas.

FIG. 9 shows an example of the management relation information 570. As shown in the figure, the management relation information 570 comprises: an upper data storage apparatus storage part 5701 for storing information on an upper data storage apparatus; and a lower data storage apparatus storage part 5702 for storing information on lower data storage apparatuses having lower storage areas connected hierarchically to storage areas provided by the upper data storage apparatus.

Further, the upper data storage apparatus storage part 5701 comprises: a data storage apparatus number 5701a for specifying the data storage apparatus; a management interface identification number 5701b for specifying the management interface of the data storage apparatus in question; a management program identification number 5701c for specifying a management program provided in the management computer 501 for each data storage apparatus; an icon number 5701d; and an identifier 5701d.

The lower data storage apparatus storage part 5702 comprises: data storage apparatus numbers 5702a; management interface identification numbers 5702b; management program identification numbers 5702c; icon numbers 5702d; and identifiers 5702c.

When the management computer 501 receives the hierarchy information 245, then, from the identifier 245b, the management computer 501 extracts the identifier specifying the upper data storage apparatus, and stores the extracted identifier as the identifier 5701e of the upper data storage apparatus 5701. Further, from the identifiers 245e, the management computer 501 extracts all the identifiers that are stored in the identifiers 245e and specify the lower data storage apparatuses, and stores the extracted identifiers as the identifiers 5702c of the lower data storage apparatuses 5702.

Next, the management computer 501 stores information specifying the management programs and information specifying the management interfaces as communication interfaces, into the corresponding management program identification numbers 5701c and 5702c and the corresponding management interface identification numbers 5701b and 5702b, respectively. The information specifying the management programs and the information specifying the management interfaces can be determined when the management computer 501 acquires the storage area information 248, 148 and 198 of the data storage apparatuses 201, 101 and 102, by means of the below-mentioned storage area information collecting program 520.

Here, the data storage apparatus numbers are numbers that are given for the sake of convenience for identifying the data storage apparatuses specified by the identifiers, respectively. In the present embodiment, the numbers used in FIG. 2 for specifying the data storage apparatuses are used as the data storage apparatus numbers. Namely, in the case of the data storage apparatus 201 that is specified by the identifier 5701e, "ABC.XX200.0123", "201" is stored as the data storage apparatus number. In the cases of the data storage apparatuses 101 and 102, which are specified by their identifiers 5702e, "GHI.ZZ100.0789" and "DEF.YY100.0456", "101" and "102" are stored as the respective data storage apparatus numbers.

Further, the icon numbers 5701d and 5702d are given when the below-mentioned choosing program 5525 generator the screen image 620.

<Processing in the Management Computer 501>

Figure 10:
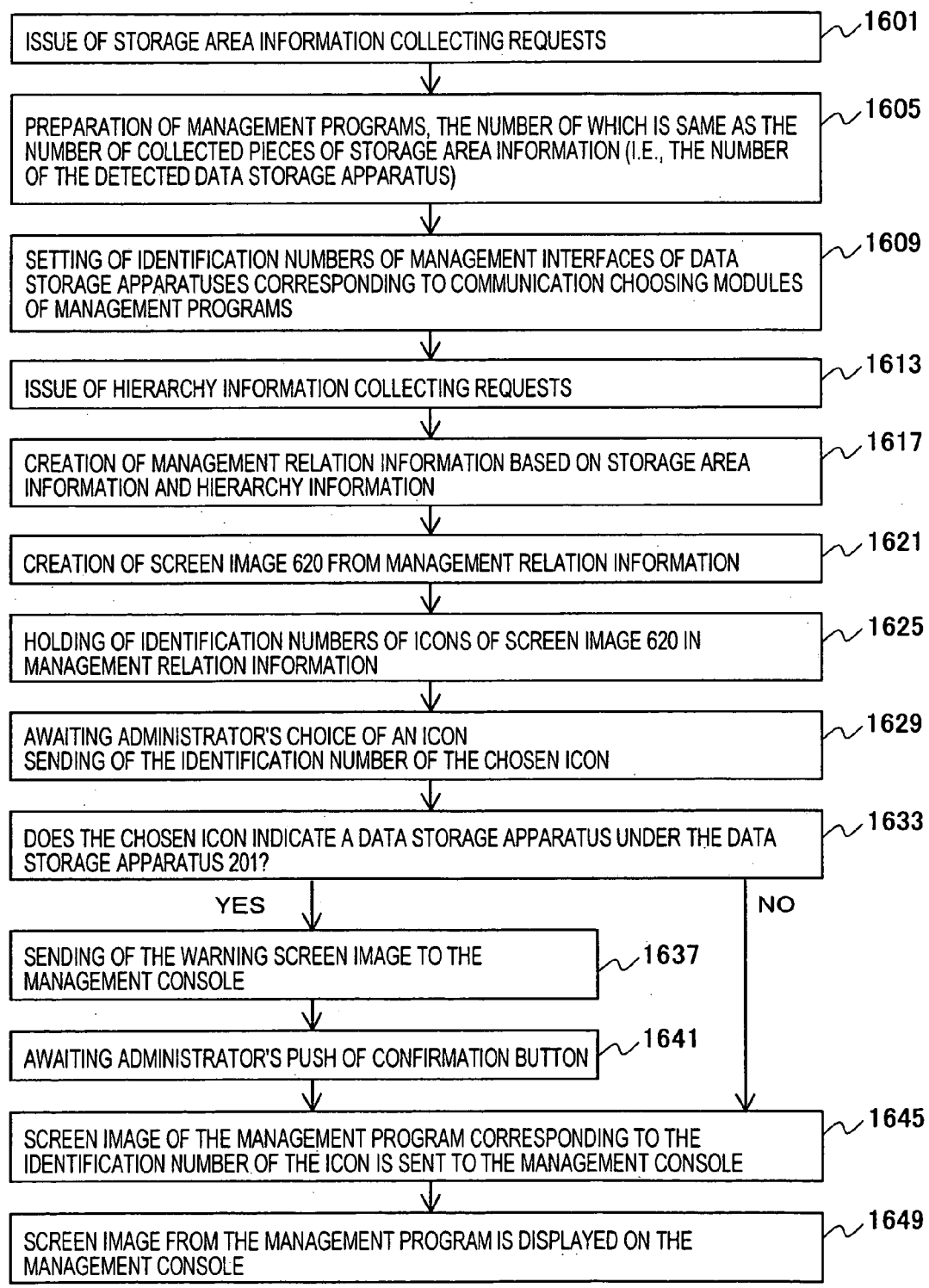
FIG. 10 is a flowchart showing processing of the management computer of the first embodiment.

Next, referring to a flowchart of FIG. 10, will be described processing performed in the management computer 501 in the case where storage areas have hierarchy, in the computer system of the present embodiment.

[Step 1601]

The CPU 511 of the management computer 501 executes the storage area information collecting 520 to issue storage area information collecting requests through the network interface 510 to all the storage area connected to the management network 410, trying to collect the storage area information 248, 148 and 198 from the data storage apparatuses 210, 101 and 102.

Receiving respective storage area information collecting requests from the management computer 501, the data storage apparatuses 210, 101 and 102 execute the storage area information collecting request processing programs 225, 125 and 175 to return the storage area information 248, 148 and 198 to the management computer 501, respectively.

From the storage area information 248, 148 and 198 collected by means of the storage area information collecting program 520, the CPU 511 recognizes that the data storage apparatuses 210, 101 and 102 are connected to the management network 410.

In the present embodiment, it is possible to collect the storage area information 248, 148 and 198 shown in FIG. 7 from the three data storage apparatuses 201, 101 and 102. By means of the storage area information collecting program 520, the CPU 511 compares identifiers 248c, 148c and 198c included in the collected storage area information 248, 148 and 198 with the identifier format information 650, to acquire the vendor names, the apparatus names and the manufacturer's serial numbers of the data storage apparatuses 210, 101 and 102. And, based on the acquired information, the CPU 511 can identify the data storage apparatuses 201, 101 and 102 connected to the management network 410.

[Step 1605]

By means of the storage area information collecting program 520, the CPU 511 of the management computer 501 prepares management programs, the number of which corresponds to the storage area information that can be collected in the above-described step. In the present embodiment, three pieces of data area information can be collected in the above-described step. Accordingly, by means of the storage area information collecting program 520, the CPU 511 recognizes that three data storage apparatuses are connected, and prepares three management programs (521–523) in the memory 513.

In the present embodiment, the management programs corresponding to the data storage apparatuses have been loaded onto the memory 513 in advance. And, here, those programs are activated such that the choosing program 525 can be executed.

[Step 1609]

Then, by means of the storage area information collecting program 520, the CPU 511 of the management computer 501 sets the management interface identification numbers 248b, 148b and 198b included respectively in the storage area information 248, 148 and 198, into the communication choosing modules provided in the management programs 521, 522 and 523.

Here, each of the communication choosing modules is a module for specifying the identification number of the interface that the management program concerned can communicate with. In the present embodiment, the management programs 521, 522 and 523 are each prepared such that the management program in question can communicate with the management interface having the identification number set in the communication choosing module.

In the present embodiment, "220" is set into the communication choosing module of the management program 521, "120" into the communication choosing module of the management program 522, and "170" into the communication choosing module of the management program 523. Thus, in the present embodiment as the management interface identification numbers 248b, 148b and 198b held in the storage area information 248, 148 and 198, the numbers shown in FIGS. 7A, 7B and 7C are given, respectively. However, IP addresses given in advance to the management interfaces may be set into the communication choosing modules, respectively. Through the management interfaces 220, 120 and 170, the management program 521 can communicate with the data storage apparatus 201 only, the management program 522 with the data storage apparatus 101 only, and the management program 523 with the data storage apparatus 102 only.

[Step 1613]

Next, the CPU 511 of the management, computer 501 executes the hierarchy information collecting program 540 to issue hierarchy information collecting requests through the network interface 510 to all the data storage apparatuses 201, 101 and 102 connected to the management network 410, trying to collect the hierarchy information from the data storage apparatuses 201, 101 and 102.

In the present embodiment, only the data storage apparatus 201 has lower storage areas, and accordingly, has the hierarchy information collecting request processing program 226.

Among the data storage apparatuses 201, 101 and 102 that have received the hierarchy information collecting requests, only the data storage apparatus 201 holds the hierarchy information 245 and can return the hierarchy information 245. The CPU 221 of the data storage apparatus 201 executes the hierarchy information collecting request processing program 226 to return the hierarchy information 245 to the management computer 501. In the present embodiment, the management computer 501 can acquire the hierarchy information 245 shown in FIG. 8.

[Step 1617]

By means of the hierarchy information collecting program 540, the CPU 511 of the management computer 501 recognizes that the data storage apparatuses 101 and 102 are connected under the data storage apparatus 201, based on the identifiers 245b, the lower storage area existence flags 245d and the identifiers 245e included in the acquired hierarchy information 245. Then, by means of the management relation information creation program 550, the CPU 511 of the management computer 501 creates the management relation information 570 from the acquired storage area information 248, 148 and 198 and the acquired hierarchy information 245.

[Step 1621]

The CPU 511 of the management computer 501 executes the choosing program 525. The choosing program 525 refers to the management relation information 570 to create a screen image 620 to be displayed on the management console 601. By means of the choosing program 525, the CPU 511 sends the created screen image 620 to the management console 601 through the network interface 590.

Receiving the screen image 620 from the choosing program 525, the management console 601 displays the screen image 620 in the display area 611 of the display unit 610.

FIG. 11 shows an example of the screen image in the present embodiment. The screen image 620 includes an icon 621 indicating the data storage apparatus 201, an icon 622 indicating the data storage apparatus 101, and an icon 623 indicating the data storage apparatus 102. Those icons are displayed in a tree view using line segments 629 expressing the hierarchy, according to the hierarchy recognized from the management relation information 570. Further, in the respective neighborhoods of the icons 621, 622 and 623 indicating the data storage apparatuses 201, 101 and 102, there are provided display areas 631–633 each displaying the vendor name, the apparatus name and the manufacturer's serial number.

[Step 1625]

At that time, the choosing program 525 stores the respective identification numbers of the icons 621, 622 and 623 (which are displayed on the display unit 610 and indicate respectively the data storage apparatuses 201, 101 and 102) into the management relation information 570. As a result, when the management computer 501 receives an administrator's designation that chooses a certain icon, then, the management computer 501 can recognize the designated data storage apparatus from the management relation information 570. In the present embodiment, the respective numbers "621", "622" and "623" of the icons shown in FIG. 11 are held in the management relation information 570.

[Step 1629]

The administrator who uses the management console 601 can use a mouse (not shown) provided to the management console 601 to operate a mouse cursor 699 on the display unit 610.

Receiving the choice by the administrator, the management console 601 sends the identification number of the chosen icon to the management computer 501 through the network interface 590.

In the present embodiment, as shown in FIG. 11, three icons 621–622 are shown in the screen image 620 displayed in the display area 611. Moving the mouse cursor 699 on the display unit 610, and pushing a mouse's button when the cursor 699 is at the desired icon, the administrator can choose a target data storage apparatus. The input device or the management console 601 is not limited to the mouse, and, for example, a keyboard may be used.

[Step 1633]

Next, by means of the choosing program 525, the CPU 511 of the management computer 501 judges the data storage apparatus chosen by the administrator through the mouse. Here, it is judged whether a lower data storage apparatus (i.e., a data storage apparatus under another data storage apparatus) has been chosen or not.

When the chosen data storage apparatus is a data storage apparatus under another data storage apparatus, the processing flow proceeds to the below-described step 1637, and otherwise, the processing flow proceeds to the below-described step 1645.

In the present embodiment, the CPU 511 of the management computer 501 generates the management relation information 570 based on the hierarchy information 245, and uses the management relation information 570 to make up the screen image 620 by means of the choosing program 525. As a result, the hierarchy in the screen image 620 displayed on the management console 601 coincides with the hierarchy of the data storage apparatuses 201, 101 and 102. Thus, when the icon 622 or 623 is chosen on the screen image 620 displayed on the display unit 610 of the management console 601, then, by means of the choosing program 525, the CPU 511 of the management computer 501 can judge from the management relation information 570 that the data storage apparatus 101 or 102 under the data storage apparatus 201 has been chosen.

[Step 1637]

Receiving the identification number of the chosen icon, the CPU 511 of the management computer 501 refers to the management relation information 570. When, by means of the choosing program 525, the CPU 511 recognizes from the management relation information 570 that the data storage apparatus corresponding to the identification number 5701$d$ or 5702$d$ of the chosen icon is under another data storage apparatus, then, the CPU 511 executes the operation warning program 526 to generate a screen image 640 indicating that operation on the chosen data storage apparatus will affect the upper data storage apparatus and to send the generated screen image 640 to the management console 601.

Figure 12:
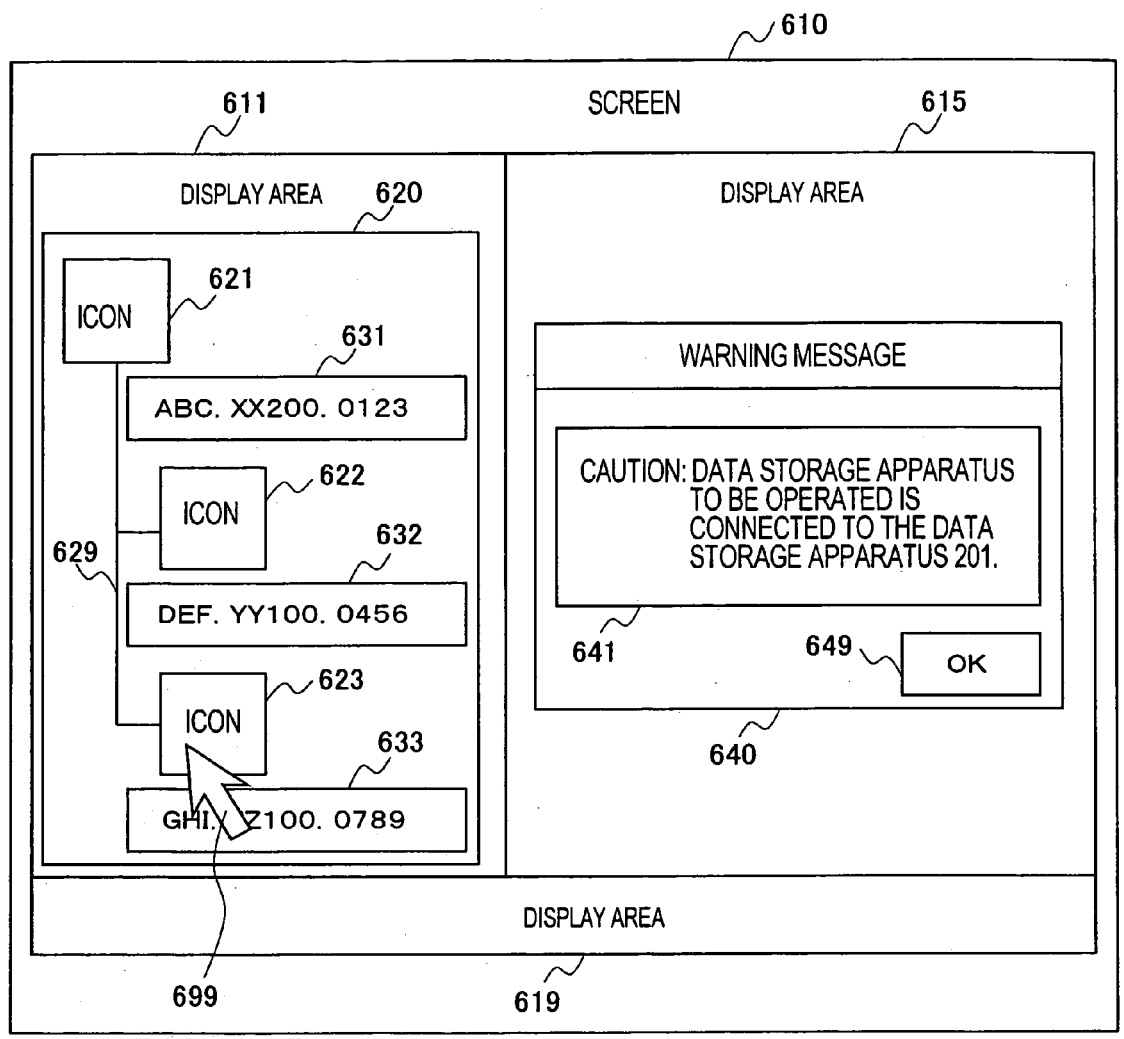
FIG. 12 shows a screen image in the first and second embodiments.

The management console 601 displays the received screen image 640 in a display area 641. FIG. 12 shows an example in which the screen image 620 and the screen image 640 are displayed on the management console.

As shown in the figure, the screen image 640 comprises a warning message display area 641 and an OK button for receiving an instruction of confirmation from the administrator.

[Step 1641]

When the administrator confirms the warning on the display unit 610 of the management console 601, the administrator pushes the confirmation button 649 using the mouse cursor 699. Receiving the push of the confirmation button 649, the management console 601 notifies the CPU 511 of the management computer 501 to that effect.

[Step 1645]

When the CPU 511 of the management computer 501 receives the identification number 621, 622 or 623 of the chosen icon, then, by means of the choosing program 525, the CPU 511 refers to the management relation information 570 to acquire the management program number 5701$c$ or 5702$c$ corresponding to the received identification number 5701$d$ or 5702$d$ of the icon. Then, the CPU 511 instructs the management program of the acquired number 521, 522 or 523 to send the management console 601 a screen image for managing the data storage apparatus in question. Here, the screen image send by the management program in question is a configuration display screen, a status display screen, a setting input screen, or the like used for managing the data storage apparatus.

[Step 1649]

Receiving the screen image from the management program 521, 522 or 523, the management console 601 displays the received screen image in the display area 615 on the display unit 610.

In the present embodiment, according to the above-described processing by the management computer 501, as the screen image 620, the hierarchy of the data storage apparatuses is displayed in the display area 611 on the display unit 610 of the management console 601, and the management information of the data storage apparatus designated by the administrator is displayed in the display area 615 on the display unit 610.

When the administrator chooses a data storage apparatus, which the administrator wishes to manage, through the screen image 620 generated by the choosing program 525, the administrator can display the management program for managing the target data storage apparatus on the management console, to confirm the configuration or the status, or to perform setting of the data storage apparatus. At that time, it is possible at the same time to confirm the data storage apparatuses' hierarchy information that can not be recognized from the computers 301–304, and this reduces, for example, the risk of deleting a storage area used by an upper data storage apparatus without being conscious of the hierarchy.

<Notification Processing of a Data Storage Apparatus>

Next, will be described notification processing of a data storage apparatus 201, 101 or 102. The notification processing of a data storage apparatus 201, 101 or 102 means processing of immediately notifying the management computer 501 of a change in the status of a data storage apparatus 201, 101 or 102 when the change occurs in the data storage apparatus 201, 101 or 102 owing to, for example, a failure in a component part of the data storage apparatus in question.

In the present embodiment, to perform the notification processing, the data storage apparatuses 201, 101 and 102 have the notification destination holding tables 242, 142 and 192 and the status change notification programs 227, 127 and 177, respectively.

The notification destination holding tables 242, 142 and 192 each hold the network interface number 510 or 590 of the management computer 501 for sending a notification when a change occurs in the status of the data storage apparatus 201, 101 or 102 concerned. When a status change occurs, the status change notification program 227, 127 or 177 notifies information indicating the kind of the status change, as status change notification information 900, to the network interface 510 or 590.

Figure 13:
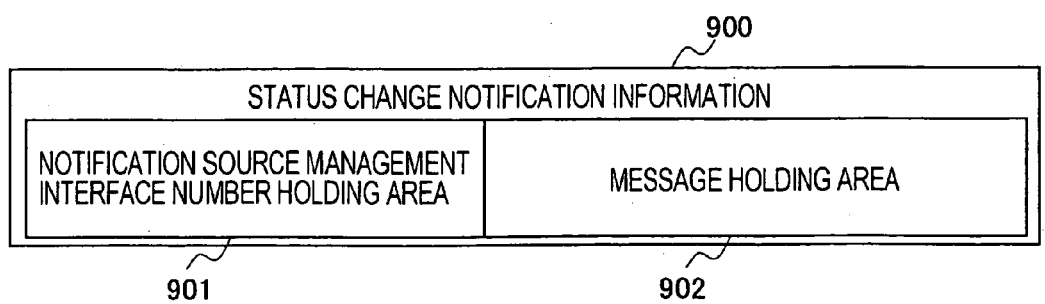
FIG. 13 is a diagram showing an example of status change notification information in the first and second embodiments.

FIG. 13 shows the status change notification information 900 in the present embodiment. As shown in the figure, the status change notification information 900 comprises a management interface number holding area 901 for holding the management interface number of the notification source, and a message holding area 902 for holding a message.

The management interface number holding area 901 stores the management interface number of the data storage apparatus that has issued the message. In the present embodiment, the number shown in FIG. 2 is stored. Further, the message holding area 902 stores a message expressing a status, such as "a magnetic disk unit of the data storage apparatus 101 has filed", for example.

Figure 14:
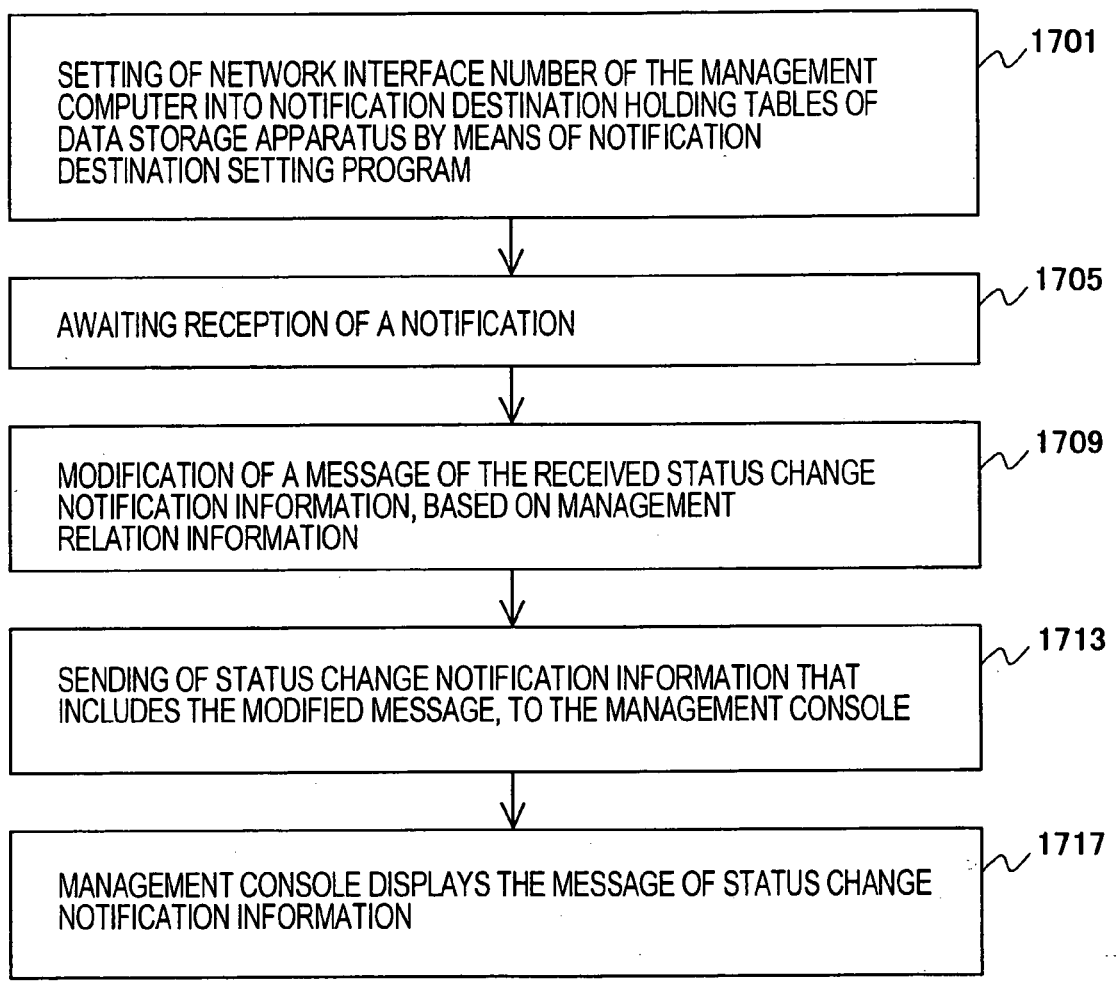
FIG. 14 is a flowchart showing processing of notification from a data storage apparatus of the first and second embodiments.

In the following, the notification processing of a data storage apparatus will be described referring to a flowchart of FIG. 14.

[Step 1701]

For immediately recognizing a change in the statuses of the data storage apparatuses 201, 101 and 102, the CPU 511 of the management computer 501 executes the notification destination setting program 527 to set a network interface number of the management computer 501 to the notification destination holding tables 242, 142 and 192 of all the data storage apparatuses 201, 101 and 102 connected to the management computer 501. The network interface number of the management computer 501 is used for receiving a status change notification. Here, for example, "510" is set as the network interface number of the management computer 501.

[Step 1705]

As a result, the management computer 501 can receive a notification when a change occurs in the status of a data storage apparatus. In this state, the management computer 501 awaits a notification.

[Step 1709]

In the present embodiment, the management computer 501 is provided with notification modification program 528. The notification modification program 528 refers to the management relation information 570 to correctly recognize the hierarchy of the data storage apparatuses in the computer system.

The CPU 511 of the management computer 501 executes the notification modification program 528 to refer to the management interface number holding area 901 of status change notification information 900 received through the network interface 510, in order to recognize which data storage apparatus has sent the notification. Then, by means of the notification modification program 528, the CPU 511 modifies the contents of the received message it to a message reflecting the hierarchy.

In detail, when status change notification information 900 including a message "a magnetic disk unit of the data storage apparatus 101 has failed" is received, then, by means of the notification modification program 528, the CPU 511 refers to the management relation information 570 to recognize that the data storage apparatus 101 is under the data storage apparatus 201, and modifies the message into a message "a magnetic disk unit of the data storage apparatus 101 under the data storage apparatus 201 has failed".

[Step 1713]

By means of the notification modification program 528, the CPU 511 sends the status change notification information 900 including the modified message to the management console 601.

[Step 1717]

The management console 601 prepares the display area 619 on the display unit 610, to display the received message.

In the present embodiment, according to the above-described processing, it is possible to modify status change notification information 900 received from a data storage apparatus into status change notification information 900 reflecting the hierarchical configuration of the data storage apparatuses, and to display the modified status change notification information 900 on the management console 601.

According to thus-described arrangement of the present embodiment, the administrator can acquire information reflecting the hierarchy even when; the status of the data storage apparatuses is changed, and thus, can judge correctly at processing operation performed thereafter.

The above-described embodiment has been described talking the example where only a data storage apparatus having a lower data storage apparatus is provided with the hierarchy information 245. However, a form of holding the hierarchy information 245 is not limited to this. For example, the lower data storage apparatuses may hold the hierarchy information 245 also.

In the case where the lower data storage apparatuses hold the hierarchy information 245 also, the management computer 501 refers to the lower storage area existence flags 245*d* out of the hierarchy information 245 acquired from a lower data storage apparatus, to judge whether there exists a lower data storage apparatus. Namely, the flags 245*d* show the value "0", then it is judged that no lower data storage apparatus exists.

Further, the above embodiment has been described taking the example where the respective management programs are prepared correspondingly to the data storage apparatuses. However, the present invention is not limited to this. For example, one management program may accommodate a plurality of data storage apparatuses, and manage identification numbers of the management interfaces of that plurality of data storage apparatuses, so that the management computer can communicate with an individual data storage apparatus. In that case, it is not necessary to activate management programs, the number of which is same as the number of the data storage apparatuses, and it is sufficient to activate a management program or programs corresponding to a plurality of data storage apparatuses detected.

[Second Embodiment]

Now, a second embodiment of the present invention will be described referring to drawings.

<Outline>

A second embodiment further comprises management computer 5011 and 5012 as management computers for respectively managing the data storage apparatuses 101 and 102. The management computer 501 manages the data storage apparatuses 201, 101 and 102 similarly to the first embodiment. However, the data storage apparatuses 101 and 102 are connected to the management computer 501 through the management computers 5011 and 5012, respectively. The management computer 501 manages the data storage apparatuses 101 and 102 through the management computers 5011 and 5012, respectively.

In the present embodiment, the management computer 501 directly manages the data storage apparatus 201 by means of a management program 521 to be executed in the management computer 501. However, the data storage apparatuses 101 and 102 are managed by means of management programs 522 and 523 to be executed in the management computers 5011 and 5012, respectively.

In the following, will be described a management system of data storage apparatuses in a computer system having a plurality of hierarchically-connected data storage apparatuses, in the case of the present embodiment where the data storage apparatuses are connected with the respective management computers 5011 and 5012. In the description of the present embodiment, the same numerals indicate components having the same functions or configurations as in the first embodiment, and details of those components are not described.

<System Configuration>

Figure 15:
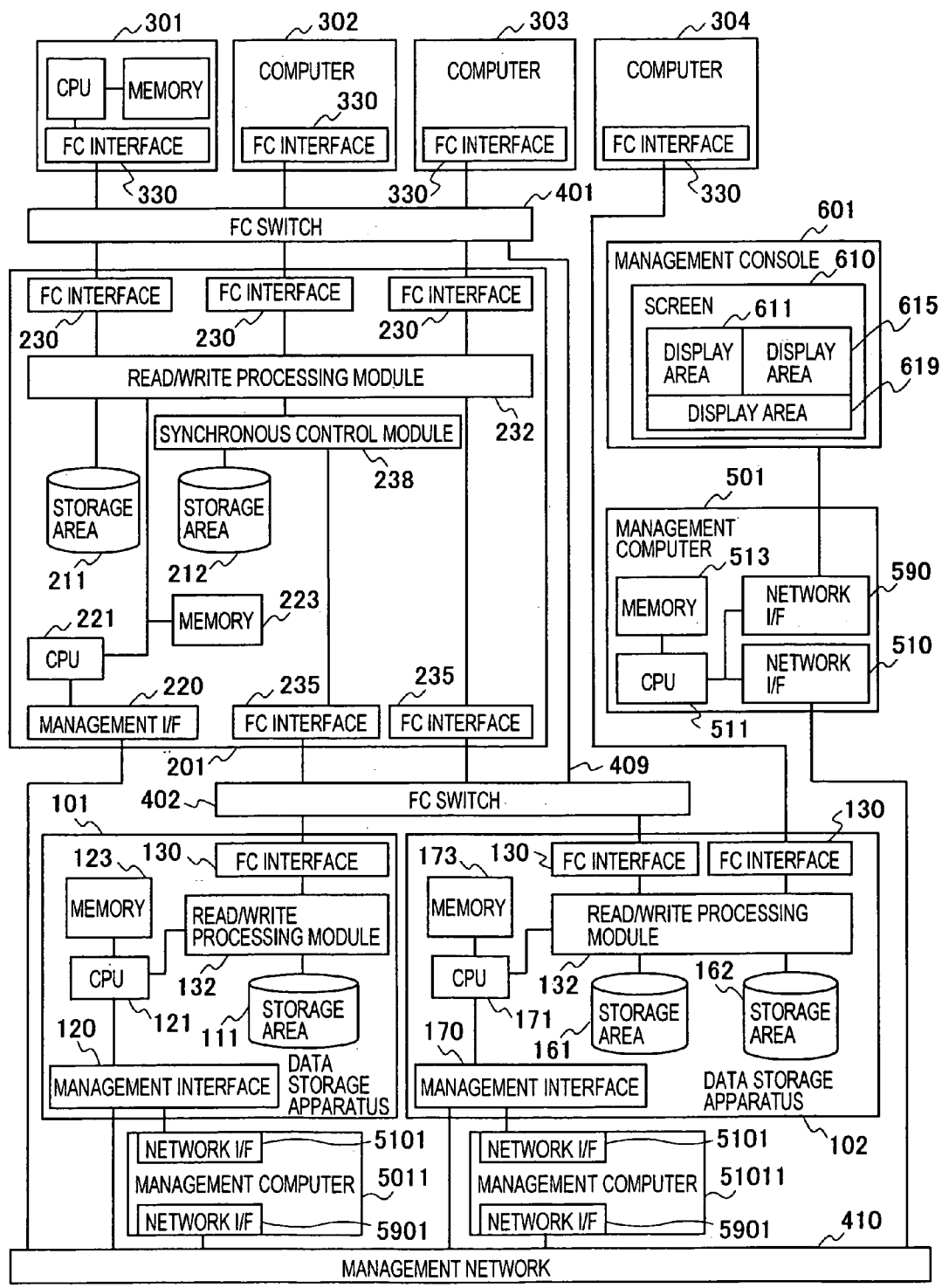
FIG. 15 is a system configuration diagram of the second embodiment.

FIG. 15 shows a computer system of the second embodiment.

As shown in the figure, the computer system of the present embodiment further comprises the management computer 5011 between the data storage apparatus 101 and the management network 410 and the management computer 5012 between the data storage apparatus 102 and the management network 410, in addition to the components of the computer system of the first embodiment.

Each of the management computers 5011 and 5012 is connected to the data storage apparatus 101 or 102 and the management computer 410 through respective network interfaces 5101 or 5102 and 5901 or 5902.

Figure 16:
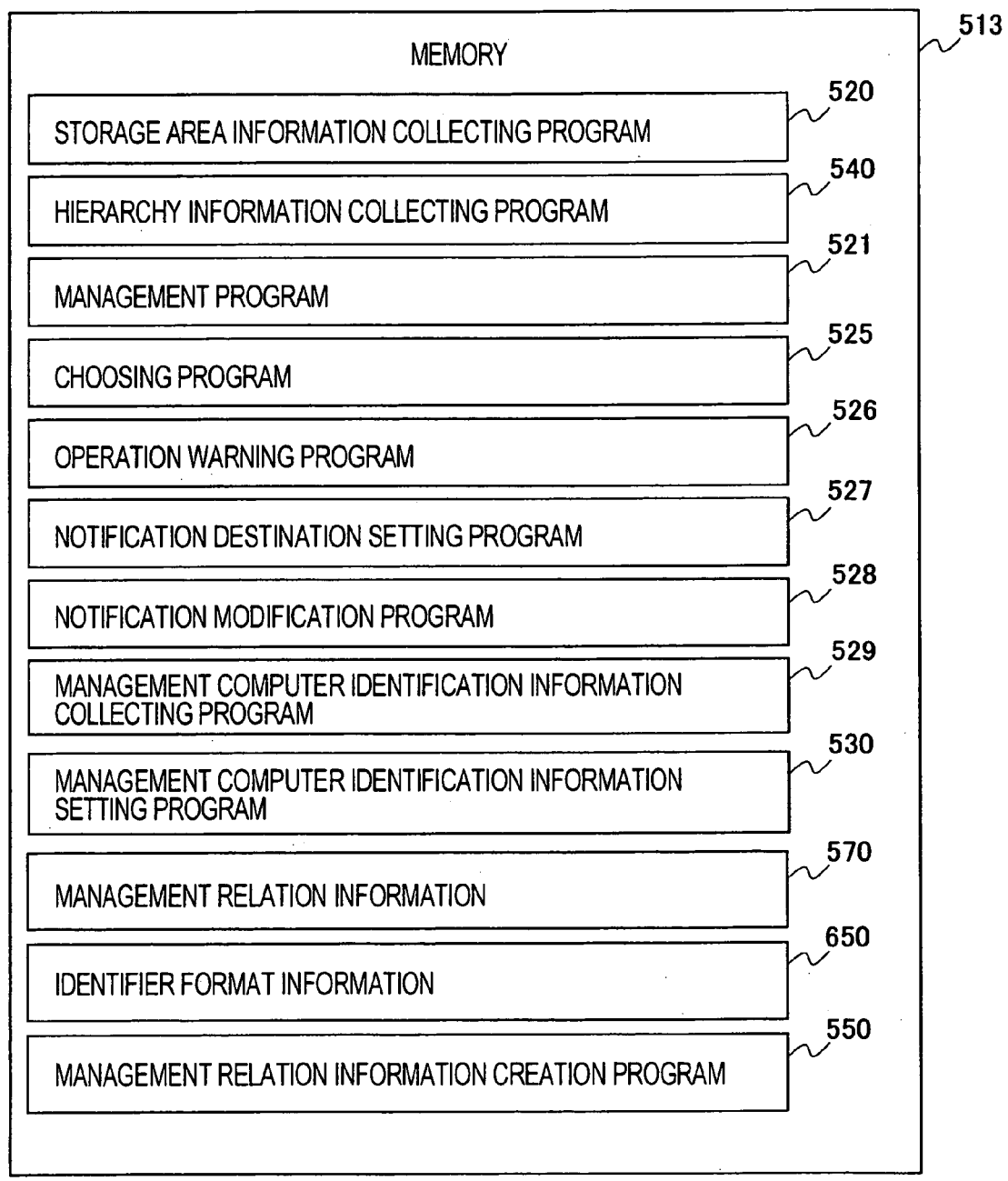
FIG. 16 is diagram showing an example of programs and data held in a memory of a management computer of the second embodiment.
Figure 17:
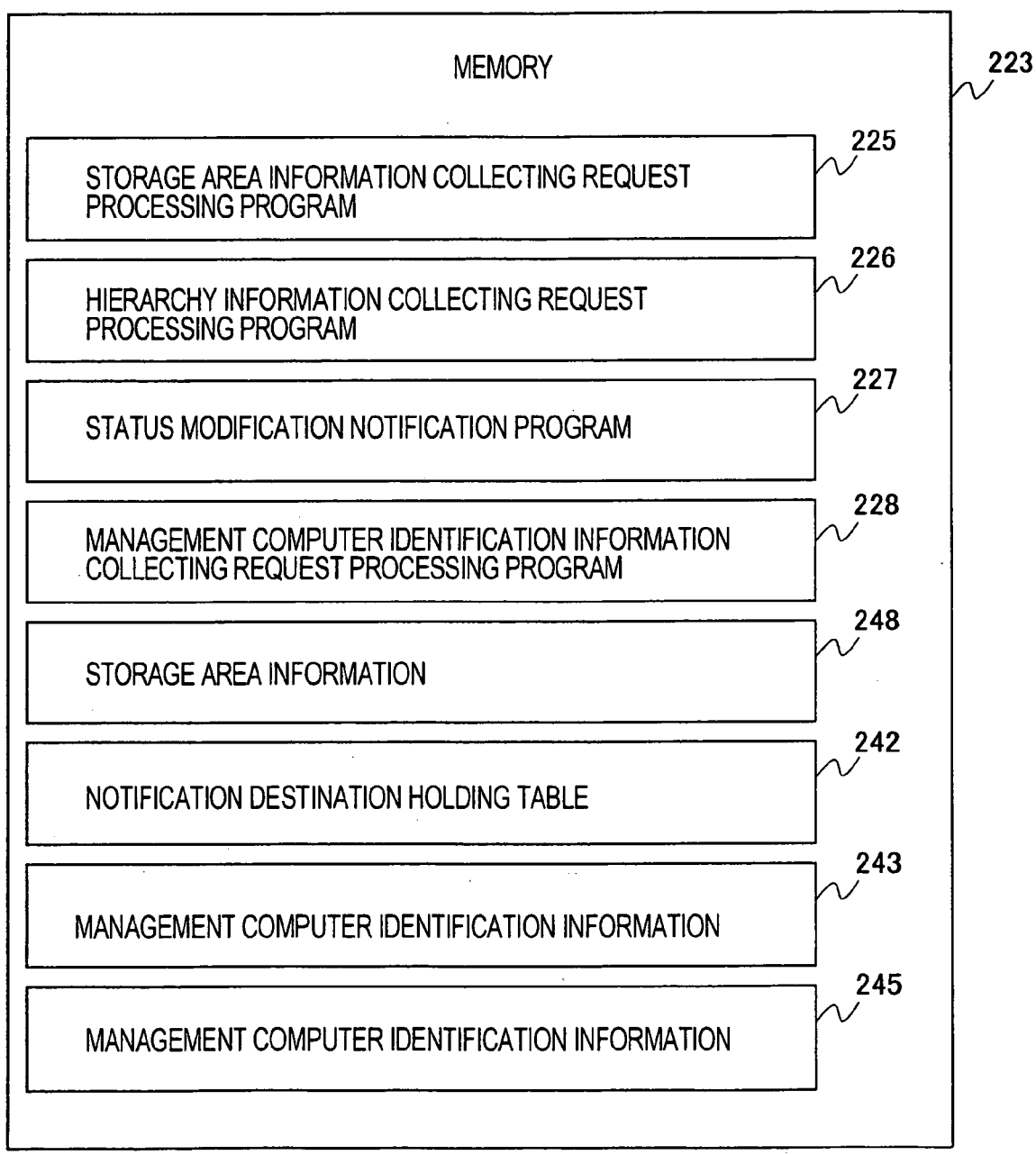
FIG. 17 is a diagram showing an example of programs and data held in a memory 223 of a data storage apparatus 201 of the second embodiment.
Figure 18A:
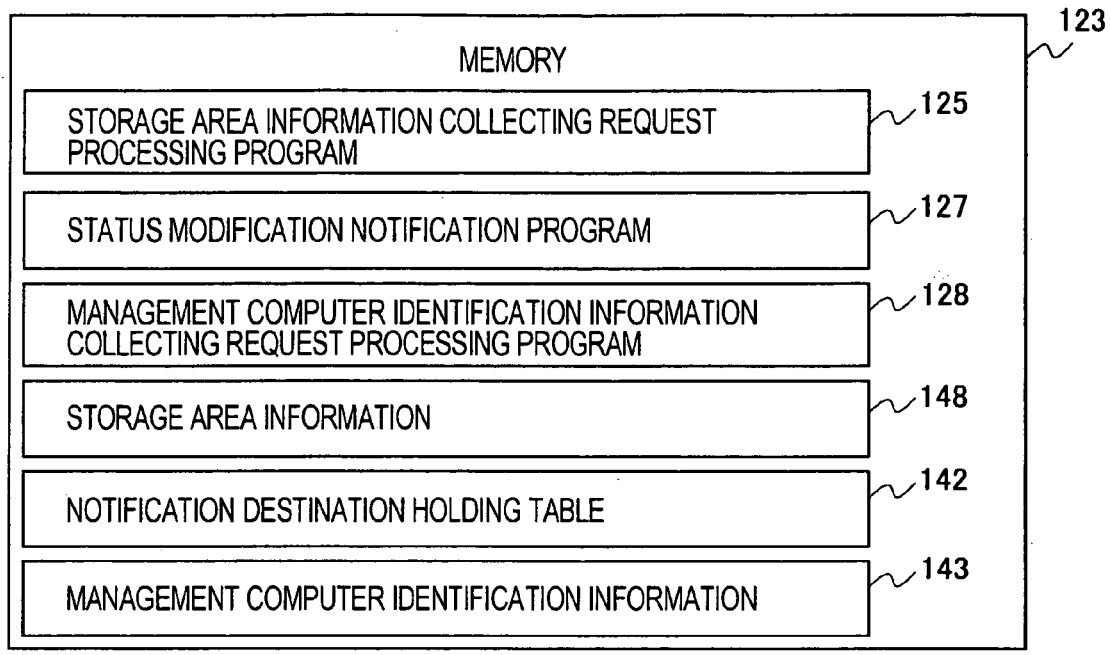
FIG. 18A is a diagram showing an example of programs and data held in a memory 123 of a data storage apparatus 101 of the second embodiment.
Figure 18B:
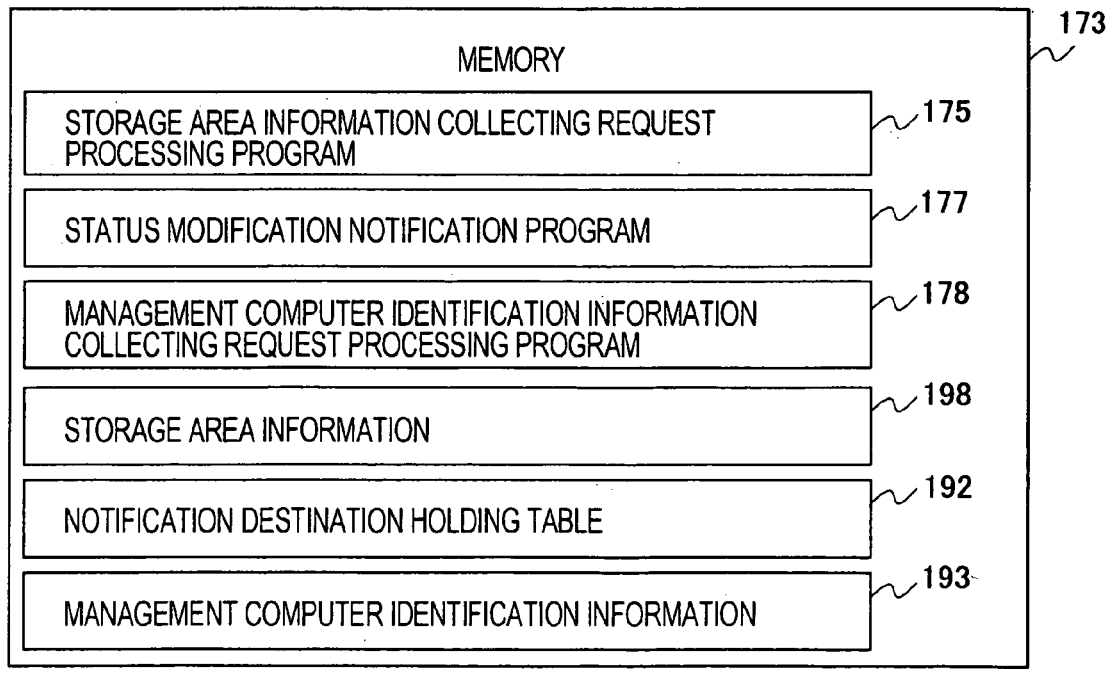
FIG. 18B is a diagram showing an example of programs and data held in a memory 173 of a data storage apparatus 102 of the second embodiment.

FIG. 16 shows programs and date held in the memory 513 of the management computer 501 of the present embodiment. Further, FIGS. 17, 18A and 18B show programs and data held in the memories 223, 123 and 173 of the data storage apparatuses 210, 101 and 102, respectively.

The memory 223 of the data storage apparatus 201 stores, in addition to the data and programs hold in the case of the first embodiment: management computer identification information 243 for holding identification information used for identifying a management computer that manages the data storage apparatus 201 now; and management computer identification information collecting request processing program 228 for processing a management computer that manages the data storage collecting request from a management computer.

Further, the memory 123 of the data storage apparatus 101 stores, in addition to the data and programs held in the case of the first embodiment: management computer identification information 143 for holding identification information used for identifying a management computer that manages the data storage apparatus 101 now; and a management computer identification information collecting request processing program 128 for processing a management computer identification information collecting request from a management computer. And, the memory 173 of the data storage apparatus 102 stores, in addition to the data and programs held in the case of the first embodiment: management computer identification information 193 for holding identification information used for identifying a management computer that manages the data storage apparatus 102 now; and a management computer identification information collecting request processing program 178 for processing a management computer identification information collecting request from a management computer.

The memory 511 of the management computer 501 stores, in addition to the data and programs hold in the case of the first embodiment: a management computer identification information collecting program 529 for collecting management computer identification information from the management computer identification information held by a data storage apparatus, in order to recognize which management computer manages the data storage apparatus at present; and a management computer identification information setting program 530 for setting identification information of a management computer connected to a data storage apparatus.

<Format of Management Computer Identification Information>

As shown in FIGS. 19A–19C, the management computer identification information 243, 143 and 193 each comprise: a first network interface number holding area 243a, 143a or 193a for holding an identification number of a network interface of the management computer 501, 5011 or 5012 connected to the data storage apparatus 201, 101 or 102: a second network interface number holding area 243b, 143b or 193b for holding an identification number of a network for the management computer 501, 5011 or 5012 to communicate with another management computer; and a management program number holding area 243c, 143c or 193c for holding an identification number of the management program held by the management computer in question.

Here, in the case where a data storage apparatus does not use a management computer, "0" is stored into the first network interface number holding area 243a, 143a or 193a and into the second network interface number holding area 243b, 143b or 193b. In that case, there is not a management program either, and "0" is stored into the management program number holding area 243c, 143c or 193c also.

For example, in FIG. 19A, both the first network interface number holding area 243a and the second network interface number holding area 243b store "0". This means that the data storage apparatus 201 having the management computer identification information 243 has no management computer in use.

<Prerequisites for the Management Programs of the Data Storage Apparatuses 101 and 102>

In the present embodiment, in the management computer 5011, an unshown memory stores the management program 522 for managing the data storage apparatus 101, and an unshown CPU executes the management program 522. Further, in the management computer 5012, an unshown memory stores the management program 523 for managing the data storage apparatus 102, and an unshown CPU executes the management program 523.

Thus, in the present embodiment, the data storage apparatus 101 is managed by the management computer 5011, and the data storage apparatus 102 is managed by the management computer 5012.

As shown in FIG. 19B, the management computer identification information 143 held in the memory 123 of the data storage apparatus 101 stores: as the first network interface number 143a, the network interface 5101 for the management computer 5011 to connect to the data storage apparatus 101; as the second network interface number 143b, the network interface 5901 for the management computer 5011 to connect to the management computer 501 through the management network 410.

Similarly, as shown in FIG. 19C, the management computer identification information 193 held in the memory 173 of the data storage apparatus 102 stores the first network interface number 193*a* and the second network interface number 193*b*.

<Processing by the Management Computer 501>

Figure 20:
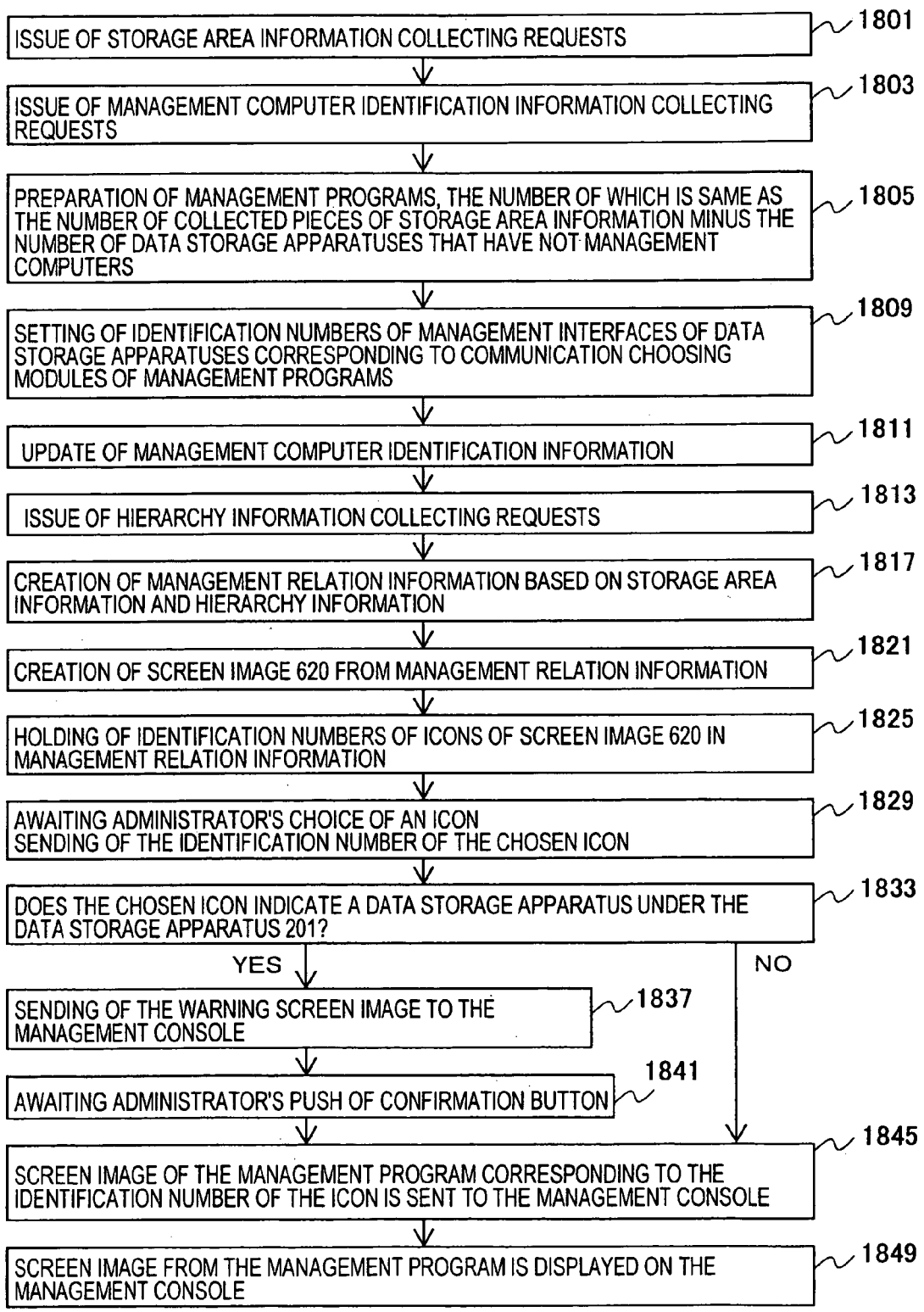
FIG. 20 is a flowchart showing processing of the management computer of the second embodiment.

Next, processing by the management computer 501 in the present embodiment will be described referring to a flowchart of FIG. 20.

[Step 1801]

The CPU 511 of the management computer 501 executes the storage area information collecting program 520 to issue storage area information collecting requests through the network interface 510 to all the data storage apparatus connected to the management network 410, trying to collect the storage area information 248, 148 and 198 from the data storage apparatuses 201, 101 and 102, respectively.

Receiving a storage area information collecting request from the management computer 501, each CPU 221, 121 or 171 of the data storage apparatuses 210, 101 and 102 executes the storage area information collecting request processing program 225, 125 or 175 to return the storage area information 248, 148 or 198 to the management computer 501. By means of the storage area information collecting program 520, and based on the collected storage area information 248, 148 and 198, the CPU 511 of the management computer 501 recognizes that the data storage apparatuses 210, 101 and 102 are connected to the management network 410.

In the present embodiment, similarly to the first embodiment, the storage area information 248, 148 and 198 shown in FIG. 7 can be collected from the three data storage apparatuses 201, 101 and 102.

[Step 1803]

Next, the CPU 511 of the management computer 501 executes the management computer identification information collecting program 529, to issue management computer identification information collecting requests through the network interface 510 to all the data storage apparatuses connected to the management network 410, trying to collect the management computer identification information 243, 143 and 198 from the data storage apparatuses 210, 101 and 102, respectively.

Receiving the management computer identification information collecting requests from the management computer 501, the CPUs 221, 121 and 171 of the data storage apparatuses 210, 101 and 103 execute the management computer identification information collecting request processing programs 228, 128 and 178, to return the management computer identification information 243, 143 and 193 to the management computer 501, respectively.

Collecting the management computer identification information 243, 143 and 193 by means of the management computer identification information collecting program 529, the CPU 511 recognizes the respective management computers connected to the data storage apparatuses 210, 101 and 102.

In the present embodiment, the CPU 511 acquires the management computer identification information 243 shown in FIG. 19A from the data storage apparatus 201, the management computer identification information 143 shown in FIG. 19B from the data storage apparatus 101, and the management computer identification information 193 shown in FIG. 19C from the data storage apparatus 102.

The management computer identification information 243 acquired from the data storage apparatus 201 stores "0" in both the first and second network interface number holding areas 243*a* and 243*b*, as described above. Thus, by means of the management computer identification information collecting program 529, the CPU 511 recognizes that the data storage apparatus 201 is not connected with a management computer at present.

[Step 1805]

Next, the management computer 501 judges the number of the management programs that are to be prepared in the management computer 501 itself for managing data storage apparatuses. Namely, the management computer 501 judges the number of data storage apparatuses that are each not connected to a management computer at present, and thus, should be managed by the management computer 501 itself, and prepares a judged number of management programs.

In the present embodiment, by means of the storage area information collecting program 520 and the management computer identification information collecting program 529, the CPU 511 of the management computer 501 recognizes that the three data storage apparatuses 210, 101 and 102 exist, from the number of the collected storage area information 248, 148 and 198, and that, among the three data storage apparatuses, the two data storage apparatuses 101 and 102 already have the respective management computers 5011 and 5012. Thus, by means of the storage area information collecting program 520, the CPU 511 judges that the number of data storage apparatuses to be managed by the management computer 501 itself is one, or in other words, the number of management programs to be prepared in the management computer 501 itself is one. Thus, the CPU 511 prepares only one management program 521 in the memory 513.

At that time, as another method, the data storage apparatuses 101 and 102 may generate a message that those data storage apparatuses 101 and 102 already have the management computers 5011 and 5012, and display the message through the management console 601. The administrator who sees the message can perform, for example, processing of removing the management computers 5011 and 5012 connected to the data storage apparatuses 101 and 102. By this processing, the management computer 501 can make three management programs prepared in the management computer 501 to manage the three data storage apparatuses 201, 101 and 102, according to a similar configuration to the first embodiment.

[Step 1809]

Then, by means of the storage area information collecting program 520, the CPU 511 of the management computer 501 sets the management interface identification number 248*b* held in the storage area information 248 into a communication choosing module provided in the management program 521. In the present embodiment, "220" is set into the communication choosing module of the management program 521.

[Step 1811]

The CPU 511 of the management computer 501 executes the management computer identification information setting program 530, to send information to the data storage apparatuses to which the management computer 501 itself has been connected. Here, the information to be sent is information indicating that the management computer 501 itself has been connected to those data storage apparatuses. In other words, the information to be sent is the network interface identification numbers to be used for connection of the management computer 501 itself.

In the present embodiment, the network interface identification number 510 and the network interface identification number 590 for connecting with another apparatus are sent respectively as the first and second network interface identification numbers to the data storage apparatus 201.

By means of the management computer identification information collecting request processing program 228, the CPU 221 of the data storage apparatus 201 stores the received numbers into the management computer identification information 243, to hold the numbers therein. FIG. 19D shows an example of data held in the management identification information 243 in this case.

[Step 1813]

Next, the CPU 511 of the management computer 501 executes the hierarchy information collecting program 540 to issue hierarchy information collecting requests through the network interface 510 to all the data storage apparatuses connected to the management network 410, trying to collect the hierarchy information from the data storage apparatuses.

In the present embodiment, similarly to the first embodiment, only the data storage apparatus 201 has lower storage areas, and accordingly, has the hierarchy information collecting request processing program 226. As a result, the hierarchy information can be acquired from the data storage apparatus 201 only.

Receiving the hierarchy information collecting request, the CPU 221 of the data storage apparatus 201 executes the hierarchy information collecting request processing program 226 to send the hierarchy information 245 to the management computer 501. In the present embodiment, the management computer 501 can acquire the hierarchy information 245 shown in FIG. 8.

[Step 1817]

By means of the hierarchy information collecting program 540, the CPU 511 of the management computer 501 recognizes that the data storage apparatuses 101 and 102 are connected under the data storage apparatus 201, based on the acquired hierarchy information 245. This recognition method is similar to the first embodiment. Similarly to the first embodiment, the CPU 511 the management computer 501 generates management relation information 580 from the collected storage area information 248, 148 and 198, the hierarchy information 245, and the management computer identification information 143 and 193.

FIG. 21 shows the management relation information 580 in the present embodiment. The management relation information 580 is different from the management relation information 570 shown in FIG. 9 of the first embodiment in that each of the upper data storage apparatus and the lower data storage apparatuses hold a management device number 5801f or 5802f. Referring to the management relation in information 580, the CPU 511 of the management computer 501 can recognize, by means of each program, the management computers 501, 5011 and 5012 in which the management programs for managing the data storage apparatuses 201, 101 and 102 are executed respectively, and the respective management programs 521, 522 and 523.

[Step 1821]

The CPU 511 of the management computer 501 executes the choosing program 525. The choosing program 525 refers to the management relation information 580 to generate the screen image shown in FIG. 11 similarly to the first embodiment.

[Step 1825]

Similarly to the first embodiment, the choosing program 525 stores the icon identification numbers 621, 622 and 623 displayed on the display unit 610 into the management relation information 580, to hold the icon identification numbers 621, 622 and 623 therein. In the present embodiment, the icon identification numbers "621", "622" and "623" shown in FIG. 11 are held as the icon numbers in the management relation information 580, similarly to the first embodiment.

[Step 1829]

Similarly to the first embodiment, when a choice of icon is received from the administrator, the management console 601 sends the identification number of the chosen icon to the management computer 501 through the network interface 590.

[Step 1833]

By means of the choosing program 525, the CPU 511 of the management computer 501 judges the data storage apparatus chosen by the administrator through the mouse. Here, similarly to the first embodiment, it is judged whether a lower data storage apparatus (i.e., a data storage apparatus under another data storage apparatus) has been chosen or not.

When the chosen data storage apparatus is a data storage apparatus under another data storage apparatus, the processing flow proceeds to the below-described step 1837, and otherwise, the processing flow proceeds to the below-described step 1845.

[Step 1837]

In the present embodiment also, when various programs are executed, the CPU 511 of the management computer 501 can recognize the hierarchy of the data storage apparatuses, by referring to the management relation information 580, similarly to the first embodiment.

When, by means of the choosing program 525, the CPU 511 of the management computer 501 recognizes that the data storage apparatus corresponding to the received icon identification number is under another data storage apparatus, then, similarly to the first embodiment, the CPU 511 executes the operation warning program 526 to generate the system image 640 indicating that operation on the chosen data storage apparatus will affect the upper data storage apparatus and to send the generated screen image 640 to the management console 601. Here, the screen image 640 generated and displayed on the management console 601 is similar to the first embodiment, and its details are not described here.

[Step 1841]

When the administrator confirms the warning on the display unit 610 of the management console 601, the administrator pushes the confirmation button 649 using the mouse cursor 699. Receiving the push of the confirmation button 649, the management console 601 notifies the CPU 511 of the management computer 501 to that effect.

[Step 1846]

When the CPU 511 of the management computer 501 receives the identification number of the chosen icon, then, by means of the choosing program 525, the CPU 511 refers to the management relation information 580 to acquire the management computer number and the management program number corresponding to the identification number of the received icon. Then, the CPU 511 instructs the management program of the management computer concerned to send a screen image for managing the data storage apparatus in question to the management console 601. The screen image to be sent is similar to the first embodiment.

Differently from the first embodiment, when the data storage apparatus 101 is chosen, then, by means of the choosing program 525, the CPU 511 of the management computer 501 instructs the management program 522 of the management computer 5011 to send the screen image to the management console 601. And, when the data storage apparatus 102 is chosen, the CPU 511 of the management computer 501 instructs the management program 523 of the management computer 5012 to send the screen image to the management console.

[Step 1849]

When the management console 601 receives a screen image from the management program 521, 522 or 523, then, the management console 601 displays the received screen image in the display area 615 on the display unit 610.

As described above, even in the case of the present embodiment where the management computer 501 has the data storage apparatuses 101 and 102 connected through the other management computers 5011 and 5012 respectively, and the hierarchy of the storage areas exists, the management computer 501 can correctly recognize the hierarchy of the data storage apparatuses 201, 101 and 102, and can correctly manage those data storage apparatuses. When a user tries to perform operation affecting a plurality of hierarchy levels, it is possible to notify the user to that effect.

Further, in the present embodiment, similarly to the first embodiment, it is possible to arrange the system such that a notification of a change in the status of a data storage apparatus can be processed according to the hierarchy of the data storage apparatuses. As a result, in the present embodiment also, it is possible to send a notification considering the hierarchy to the administrator.

In the present and first embodiments, it may be arranged that the management computer 501 acquires the hierarchy of the data storage apparatuses periodically or being triggered by a change notification from a data storage apparatus. Then, the management relation information can be updated within the management computer 501 for automatically recognizing the hierarchy of the data storage apparatuses even in the case of a change in the hierarchy of the data storage apparatuses.

According to the above-described embodiment, it is possible to provide a management screen through which the hierarchy of data storage apparatuses can be easily grasped in a computer system having hierarchically-arranged data storage apparatuses, and to properly notify effects of administrator's operation on the configuration of the data storage apparatuses. Further, according to the above-described embodiments, the management computer can properly acquire information such as a change in the configuration of the data storage apparatuses, and the acquired information can be presented to the administrator.

Thus, according to the above-described embodiments, it is possible to aid the administrator in the management of the data storage apparatuses.

What we claim is:

1. A management computer connected through a second network to data storage apparatuses that are connected to computers through a first network, said management computer comprising:

a storage area information collecting module which collects respective pieces of storage area information from said data storage apparatuses connected through the second network, wherein each piece of storage area information relates to storage areas provided by a data storage apparatus concerned;

a hierarchy information collecting module which collects respective pieces of hierarchy information from said data storage apparatuses connected through said second network, wherein each piece of hierarchy information indicates a data storage apparatus hierarchy of a multistage connection of said data storage apparatuses, including those data storage apparatuses that have storage areas for storing data used by said computers through a storage area of a higher one of said data storage apparatuses according to said hierarchy; and a management relation information creation module which sets said hierarchies among said data storage apparatuses to create management relation information, based on said pieces of storage area information and said pieces of hierarchy information collected in said storage area information collecting module and said hierarchy information collecting module.

2. A management computer according to claim 1, wherein:

said management computer further comprises:

a management information creation module that recognizes a number of data storage apparatuses according to a number of said pieces of storage area information collected in said storage area information collecting module and prepares pieces of management information used respectively for managing said data storage apparatuses, wherein a number of said pieces is equal to a recognized number of data storage apparatuses; and said management relation information creation module associates each of said data storage apparatuses with a piece of management information used for managing the data storage apparatus in question, and adds information indicating the association to said management relation information.

3. A management computer according to claim 1, further comprising:

a screen data creation module which creates hierarchy display screen data that is used for displaying said data storage apparatuses on a screen according to the hierarchy set in said management relation information creation module; and a screen data sending module which sends said hierarchy display screen data created in said screen data creation module to an output device connected to the management computer itself.

4. A management computer according to claim 3, wherein:

said screen data creation module creates pieces of data storage apparatus display data for respectively specifying said data storage apparatuses in said hierarchy display screen data, and adds pieces of information identifying those pieces of data storage apparatus display data to said management relation information to hold those pieces of information in said management relation information.

5. A management computer according to claim 4, further comprising:

a management module choosing module that refers to said management relation information to extract a piece of management information corresponding to a certain piece of data storage apparatus display data that is chosen when an instruction to choose said certain piece of data storage apparatus display data is received from said output device, and sends the extracted piece of management information to said output device.

6. A management computer according to claim 4, further comprising:
a warning massage creation module that:
refers to said management relation information when an instruction to choose a certain piece of data storage apparatus display data is received from said output device, to extract a data storage apparatus held in said management relation information being associated with the chosen piece of data storage apparatus display data;
judges whether the extracted data storage apparatus is a first type of data storage apparatus providing a storage area for storing data used by a computer or a second type of data storage apparatus providing a storage area for storing data used by a computer through said first type of data storage apparatus; and
when the extracted data storage apparatus is judged to be said second type of data storage apparatus, creates a warning message to send the created warning message to said output device.

7. A management computer according to claim 3, further comprising:
a notification modification module that:
refers to said management relation information to judge whether a data storage apparatus as a source of a status change notification is a first type of data storage apparatus providing a storage area for storing data used by a computer or a second type of data storage apparatus providing a storage area for storing data used by a computer through said first type data storage apparatus, when said status change notification is received from said data storage apparatus connected to said management computer through said second network; and
when said data storage apparatus is judged to be said second type of data storage apparatus, refers to said management relation information to create a new display message by reflecting the hierarchy acquired from said management relation information onto contents of the received notification.

8. A management computer according to claim 1, wherein among data storage apparatuses which are in said multistage connection, a higher one of said data storage apparatuses according to said hierarchy is designated as a first type of data storage apparatus and another one of said data storage apparatuses that is lower in said hierarchy than said higher one is designated as a second type of data storage apparatus, and
data to be stored in a second storage area of a data storage apparatus of the second type is a copy of data stored in a first storage area of a data storage apparatus of the first type.

9. A management computer according to claim 8, wherein among data storage apparatuses which are in said multistage connection, a higher one of said data storage apparatuses according to said hierarchy is designated as a first type of data storage apparatus and another one of said data storage apparatuses that is lower in said hierarchy than said higher one is designated as a second type of data storage apparatus, and
a first storage area is a virtual storage area viewed by the host computer as being formed in a data storage apparatus of the first type, and the data used by the host computer viewed as being virtually stored in the first storage area is physically stored in a second storage area of the second type.

10. A computer system comprising:
a group of data storage apparatuses including at least one first type of data storage apparatus providing a storage area for storing data used by a computer and at least one second type of data storage apparatus providing a storage area for storing data used by said computer through the first type of data storage apparatus;
a management computer that manages said group of data storage apparatuses;
a first network connecting between said computer and said group of data storage apparatuses;
a second network connecting between said group of data storage apparatuses and said management computer;
wherein:
said management computer comprises:
a storage area information collecting module which collects respective pieces of storage area information from said data storage apparatuses connected through said second network, wherein each piece of storage area information relates to storage areas provided by a data storage apparatus concerned;
a hierarchy information collecting module which collects respective pieces of hierarchy information from said data storage apparatuses connected through said second network, wherein each piece of hierarchy information indicates a data storage apparatus hierarchy of a multistage connection of said data storage apparatuses, including those data storage apparatuses that have storage areas for storing data used by said computers through a storage area of a higher one of said data storage apparatuses according to said hierarchy; and
a management relation information creation module which sets said hierarchies among said data storage apparatuses to create management relation information based on said pieces of storage area information and said pieces of hierarchy information collected in said storage area information collecting module and said hierarchy information collecting module.

11. A computer system according to claim 10, wherein among data storage apparatuses which are in said multistage connection, a higher one of said data storage apparatuses according to said hierarchy is designated as the first type of data storage apparatus and another one of said data storage apparatuses that is lower in said hierarchy than said higher one is designated as the second type of data storage apparatus, and
data to be stored in a second storage area of a data storage apparatus of the second type is a copy of data stored in a first storage area of a data storage apparatus of the first type.

12. A computer system according to claim 11, wherein among data storage apparatuses which are in said multistage connection, a higher one of said data storage apparatuses according to said hierarchy is designated as the first type of data storage apparatus and another one of said data storage apparatuses that is lower in said hierarchy than said higher one is designated as the second type of data storage apparatus, and
a first storage area is a virtual storage area viewed by the host computer as being formed in a data storage apparatus of the first type, and the data used by the host computer viewed as being virtually stored in the first storage area is physically stored in a second storage area of the second type.

13. A management method in a management computer connected through a second network to data storage apparatuses that are connected to computers through a first network, the method comprising steps of:
- collecting respective pieces of storage area information from said data storage apparatuses connected through said second network, wherein each piece of storage area information relates to storage areas provided by a data storage apparatus concerned;
- collecting respective pieces of hierarchy information from said data storage apparatuses connected through said second network, wherein each piece of hierarchy information indicates a data storage apparatus hierarchy of a multistage connection of said data storage apparatuses, including those data storage apparatuses that have storage areas for storing data used by said computers through a storage area of a higher one of said data storage apparatuses according to said hierarchy; and
- setting said hierarchies among said data storage apparatuses to create management relation information, based on said pieces of storage area information and said pieces of hierarchy information.

14. A management method according to claim 13, further comprising steps of:
- recognizing a number of data storage apparatuses according to a number of said pieces of the collected storage area information;
- preparing pieces of management information for respectively managing data storage apparatuses, wherein a number of said pieces is equal to a recognized number of data storage apparatuses; and
- associating each of said data storage apparatuses with a piece of management information used for managing the data storage apparatus in question and adding information indicating the association to said management relation information, in creating said management relation information.

15. A management method according to claim 13, further comprising steps of:
- creating hierarchy display screen data that is used for displaying said data storage apparatuses on a screen according to said management relation information; and
- sending said created hierarchy display screen data to an output device connected to the management computer itself.

16. A management method according to claim 15, further comprising of steps of;
- creating pieces of data storage apparatus display data for respectively specifying said data storage apparatuses in said hierarchy display screen data, when said hierarchy display screen data is created; and
- adding pieces of information identifying those pieces of data storage apparatus display data to said management relation information, to hold those pieces of information in said management relation information.

17. A management method according to claim 16, further comprising a step of:
- referring to said management relation information to extract a piece of management information corresponding to a certain piece of data storage apparatus display data that is chosen when an instruction to choice said certain piece of data storage apparatus display data is received from said output device, and sending the extracted piece of management information to said output device.

18. A management method according to claim 17, further comprising steps of:
- referring to said management relation information when an instruction to choice a certain piece of data storage apparatus display data is received from said output device, to extract a data storage apparatus held in said management relation information being associated with the chosen piece of data storage apparatus display data;
- judging whether the extracted data storage apparatus is a data storage apparatus (a first type data storage apparatus) providing a storage area for storing data used by said computer or a data storage apparatus (a second type data storage apparatus) providing a storage area for storing data used by said computer through said first type data storage apparatus; and
- creating a warning message to send the created warning message to said output device, when the extracted data storage apparatus is judged to be said second type of data storage apparatus.

19. A computer system comprising:
- a computer;
- data storage apparatuses;
- a management computer that manages said data storage apparatuses;
- a first network connecting between computers and said data storage apparatuses;
- a second network connecting between said data storage apparatuses and said management computer; and
- a management console connected, to said management computer; wherein:
- said data storage apparatuses include one or more first type of data storage apparatus each providing storage areas for storing data used by said computers, and one or more second type of data storage apparatus each providing storage areas for storing data used by said computers through a storage area of said first type data storage apparatuses;
- said management computer comprises a storage area information collecting module, a management information creation module, a hierarchy information collecting module, a management relation information creation module, a screen data creation module, a screen data sending module, a warning message creation module, a management module choosing module, a notification modification module, a modification notification sending module;
- wherein said storage area information collecting module issues a request to said data storage apparatuses for respective pieces of storage area information from said data storage apparatuses, wherein the data storage apparatuses receive the request from the storage area information collecting module, and send the respective pieces of storage area information to the storage area information collecting module in response to the request, and wherein each piece of storage area information relates to storage areas provided by a data storage apparatus concerned;
- wherein said management information creation module recognizes a number of data storage apparatuses according to a number of said pieces of storage area information collected in said storage area information collecting module and prepares pieces of management information used respectively for managing said data storage apparatuses, wherein a number of said pieces is equal to a recognized number of data storage apparatuses;

wherein said hierarchy information collecting module issues a request to the data storage apparatuses for respective pieces of hierarchy information, wherein the data storage apparatuses receive the request, and in response to the request, send the respective pieces of hierarchy information to the hierarchy information collecting module, wherein each piece of hierarchy information indicates a data storage apparatus hierarchy of a multistage connection of said data storage apparatuses, including those data storage apparatuses that have storage areas for storing data used by said computers through a storage area of a higher one of said data storage apparatuses according to said hierarchy;

wherein among data storage apparatuses which are in said multistage connection, a higher one of said data storage apparatuses according to said hierarchy is designated as the first type of data storage apparatus and another one of said data storage apparatuses that is lower in said hierarchy than said higher one is designated as the second type of data storage apparatus, data to be stored in a second storage area of a data storage apparatus of the second type is a copy of data stored in a first storage area of a data storage apparatus of the first type, and the first storage area is a virtual storage area viewed by the host computer as being formed in a data storage apparatus of the first type, and the data used by the host computer viewed as being virtually stored in the first storage area is physically stored in a second storage area of the second type;

wherein said management relation information creation module sets said hierarchies among said data storage apparatuses to create management relation information, based on said pieces of storage area information, said pieces of management information and said pieces of hierarchy information collected in said storage area information collecting module, said management information creation module and said hierarchy information collecting module;

wherein said screen data creation module:
creates hierarchy display screen data that is used for displaying said data storage apparatuses according to the hierarchy set in said management relation information creation module and pieces of data storage apparatus display data for respectively specifying said data storage apparatuses in said hierarchy display screen data, and adds pieces of information identifying those pieces of data storage apparatus display data to said management relation information;

wherein said screen data sending module sends said hierarchy display screen data created in said screen data creation module and said data storage apparatus display data to said management console;

wherein said warning message creation module:
refers to said management relation information when an instruction to choice a certain piece of data storage apparatus display data is received from said management console, to extract a data storage apparatus held in said management relation information being associated with the chosen piece of data storage apparatus display data;

judges whether the extracted data storage apparatus is said first type of data storage apparatus or said second type of data storage apparatus; and when the extracted data storage apparatus is judged to be said second type of data storage apparatus, creates a warning message to send the created warning message to said management console;

wherein said management module choosing module refers to said management relation information to extract a piece of management information corresponding to a certain piece of data storage apparatus display data that is chosen when an instruction to choose said certain piece of data storage apparatus display data is received from said management console, and sends the extracted piece of management information to said management console;

wherein said notification modification module:
refers to said management relation information to judge whether a data storage apparatus as a source of a status change notification is said first type of data storage apparatus or said second type of data storage apparatus, when said status change notification is received from said data storage apparatus; and when said data storage apparatus is judged to be said second type of data storage apparatus, refers to said management relation information to create a new display message by reflecting the hierarchy acquired from said management relation information onto contents of the received notification; and wherein said modification notification sending module sends the display message created in said notification modification module to said management console;

wherein said management console comprises:
a display module which displays the display data received from said management computer;

an instruction receiving module which receives an instruction from an administrator through said display module; and an instruction sending module which sends an instruction received from the administrator through said instruction receiving module to said management computer;

said display module comprises a hierarchy display area, a warning message display area and a status change notification information display area;

said hierarchy display area displays said hierarchy display screen data and said data storage apparatus display data;

said warning message display area displays said warning message; and said status change notification information display area displays the display massage received from said modification notification sending module.

* * * * *